(12) United States Patent
Nakagawa et al.

(10) Patent No.: US 7,056,983 B2
(45) Date of Patent: Jun. 6, 2006

(54) BLOCK COPOLYMER

(75) Inventors: Yoshiki Nakagawa, Kobe (JP); Masayuki Fujita, Kobe (JP); Kenichi Kitano, Kobe (JP); Tomoki Hiiro, Kobe (JP); Katsuhiko Kimura, Kobe (JP)

(73) Assignee: Kaneka Corporation, Osaka (JP)

( * ) Notice: Subject to any disclaimer, the term of this patent is extended or adjusted under 35 U.S.C. 154(b) by 70 days.

(21) Appl. No.: 09/446,521

(22) PCT Filed: Apr. 28, 1999

(86) PCT No.: PCT/JP99/02273

§ 371 (c)(1),
(2), (4) Date: Mar. 3, 2000

(87) PCT Pub. No.: WO99/55751

PCT Pub. Date: Nov. 4, 1999

(65) Prior Publication Data

US 2003/0166786 A1     Sep. 4, 2003

(30) Foreign Application Priority Data

| Apr. 28, 1998 | (JP) | ................... 10-119291 |
| May 28, 1998 | (JP) | ................... 10-147809 |
| Jun. 1, 1998 | (JP) | ................... 10-151571 |
| Jul. 23, 1998 | (JP) | ................... 10-207328 |
| Jul. 23, 1998 | (JP) | ................... 10-207329 |
| Aug. 20, 1998 | (JP) | ................... 10-234428 |
| Oct. 28, 1998 | (JP) | ................... 10-306233 |

(51) Int. Cl.
*C08F 20/18* (2006.01)
*C08F 255/00* (2006.01)

(52) U.S. Cl. .................. 525/242; 525/244; 525/245; 525/259; 525/404; 525/445; 525/479

(58) Field of Classification Search ............... 525/242, 525/244, 245, 259, 404, 445, 479, 253
See application file for complete search history.

(56) References Cited

U.S. PATENT DOCUMENTS

| 5,312,871 A | 5/1994 | Mardare et al. ............ 525/272 |
| 5,763,548 A | 6/1998 | Matyjaszewski et al. ... 526/135 |
| 5,789,487 A | 8/1998 | Matyjaszewski et al. ... 525/301 |
| 5,807,937 A | 9/1998 | Matyjaszewski et al. ... 526/135 |
| 6,696,536 B1 * | 2/2004 | Grubbs et al. .............. 526/335 |

FOREIGN PATENT DOCUMENTS

| EP | 0 349 232 B1 | 5/1993 |
| EP | 0 789 036 A2 | 8/1997 |
| EP | 0 816 385 A1 | 1/1998 |
| JP | 2-45511 A | 2/1990 |
| JP | 8-41117 A | 2/1996 |
| JP | 9-208616 A | 8/1997 |
| WO | WO 96/30421 | 10/1996 |
| WO | WO 97/1824 | 5/1997 |
| WO | WO 97/18247 | 5/1997 |
| WO | WO 97/27233 | 7/1997 |
| WO | WO 98/01480 | 1/1998 |
| WO | WO 98/40415 | 9/1998 |

OTHER PUBLICATIONS

Hawker et al., Macromol. Chem. Phys. 198, 155-166 (1997).*

* cited by examiner

*Primary Examiner*—Jeffrey Mullis
(74) *Attorney, Agent, or Firm*—Connolly, Bove, Lodge & Hutz, LLP

(57) ABSTRACT

Processes for producing an AB block copolymer, an ABA block copolymer or a multiblock copolymer are provided, which comprises adding an alkenyl-containing polymer (I) to a living or to an atom transfer radical polymerization system or a living cationic polymerization system.

29 Claims, No Drawings

BLOCK COPOLYMER

FIELD OF THE INVENTION

The present invention relates to a polymer for block copolymer produced by adding an alkenyl-containing polymer to a living radical polymerization system or living cationic polymerization system.

BACKGROUND ART

Block copolymers composed of different polymer block species bound to each other are generally produced by polymerizing different monomer species in succession. Heretofore, various methods of polymerization have been developed and attempts have been made to produce block copolymers using them. When cationic polymerization is employed, however, it is difficult to control the polymerization, since the growing species carbenium ion is unstable. In recent years, examples of the so-called living cation polymerization in which the growing carbenium ion in the cationic polymerization is inhibited from undergoing isomerization, chain transfer reaction or termination reaction have been reported. For example, Higashimura et al. (Macromolecules, 17, 265, 1984) report that cationic living polymerization is possible in vinyl ether polymerization using a combination of hydrogen iodide and iodine as an initiator. However, the polymerization using such initiator has various problems; for instance, its application is restricted to those monomers which have an alkoxy group high in electron donating ability and are highly susceptible to cationic polymerization, and the initiator is unstable and difficult to handle.

On the other hand, Kennedy et al. (Japanese Kokai Publication Sho-62-48704, Japanese Kokai Publication Sho-64-62308), by polymerizing olefin monomers, such as isobutylene, using an organic carboxylic acid or an ester, or an ether as an initiator in combination with a Lewis acid, showed that cationic living polymerization is possible with olefin monomers as well. This method has been modified in several ways, and Nippon Zeon (Japanese Kokoku Publication Hei-07-59601) has succeeded in obtaining block copolymers by successive monomer addition with additional use of an amine. In this modification, isobutylene-based block copolymers comprising an isobutylene polymer and a styrene polymer are produced in an mixed solvent composed of methylene chloride and hexane. However, such halogenated hydrocarbons containing 1 or 2 carbon atoms have problems; for instance, they are difficult to handle, and require large scale equipment for preventing them from being discharged into the environment to raise the cost of production. Although, on the other hand, such polymerization is also possible in a halogen-free solvent such as toluene, very fine adjustment is required, depending on the monomer, for the monomer to show adequate polarity. It is thus very difficult to establish the conditions for successive polymerization of two or more monomer species differing in reactivity, Furthermore, in recent years, controlled radical polymerization techniques and, further, living radical polymerization techniques have been developed, making it possible to well control the living polymerization. Matyjaszewski et al. report a method of synthesizing block copolymers by successively adding monomers using the atom transfer radical polymerization technique to be mentioned later herein or by using a macro-initiator (e.g. Macromolecules, 28, 7901, 1995). These techniques, however, may sometimes encounter problems; successive polymerization of monomers is difficult since respective monomers require different optimum polymerization conditions, or it is difficult to introduce, terminally into the macro-initiator, an initiator terminus optimal to the next monomer to be polymerized.

A further method available for the production of block copolymers comprises synthesizing respective polymer blocks individually and then coupling them to each other. In that case, however, it is not easy to accomplish the coupling reaction quantitatively and selectively. Thus, very few methods have been found that are commercially advantageous.

SUMMARY OF THE INVENTION

The present invention has for its object to provide a block copolymer composed of any of various polymers and a living radical polymerization polymer or living cationic polymerization polymer and capable of being produced with ease without requiring optimization of polymerization conditions which is difficult to achieve.

The present invention thus provides a block copolymer produced by adding an alkenyl-containing polymer (I) to a living radical polymerization system or living cationic polymerization system.

It is preferred, though not requisite, that the alkenyl group in said polymer (I) is represented by the general formula 1:

$$H_2C=C(R^1)—\tag{1}$$

(wherein $R^1$ is a hydrogen atom or a hydrocarbon group containing 1 to 20 carbon atoms).

Further, though not requisite, it is preferred that, in the general formula 1, $R^1$ be a hydrogen atom and that the terminal alkenyl group in the polymer (I) be not activated by any of a carbonyl group, an alkenyl group and an aromatic ring each conjugated with the carbon-carbon double bond thereof.

It is preferred, though not requisite, that the alkenyl group in said polymer (I) be located at a terminus of polymer (I).

It is preferred, though not requisite, that the living radical polymerization system to be used in the practice of the present invention be an atom transfer radical polymerization system.

In said atom transfer radical polymerization system, when the polymer (I) has a group capable of serving as an initiator for atom transfer radical polymerization, it is possible that the product block copolymer be a multiblock copolymer. The group capable of serving as an initiator group for atom transfer radical polymerization is not restricted but preferably is represented by the general formula 2:

$$—C(Ar)(R^2)(X)\tag{2}$$

(wherein Ar is an aryl group, which may optionally have a substituent, $R^2$ is a hydrogen atom or a hydrocarbon group containing 1 to 20 carbon atoms and X is chlorine, bromine or iodine); or a compound represented by the general formula 3:

$$—C(CO_2R)(R^2)(X)\tag{3}$$

(wherein $R^2$ is a hydrogen atom or a methyl group, R is an organic group containing 1 to 20 carbon atoms and X is chlorine, bromine or iodine).

It is preferred, though not requisite, that $R^2$ in the general formulas 2 and 3 be a hydrogen atom.

Furthermore, the metal complex to serve as a catalyst for atom transfer radical polymerization is preferably a copper, nickel, ruthenium or iron complex, in particular a copper complex.

The monomers to be polymerized in the living radical polymerization system is not particularly restricted but preferably is a (meth)acrylic monomer.

When, in the living cationic polymerization system of the present invention, the polymer (I) has a group capable of serving as an initiator group for the living cationic polymerization, the product block copolymer can be a multiblock copolymer. The group in the polymer (I) which is capable of serving as an initiator for the living cationic polymerization is not restricted but preferably is represented by the general formula 2:

$$-C(Ar)(R^2)(X) \quad (2)$$

(wherein Ar is an aryl group, which may optionally have a substituent, $R^2$ is a hydrogen atom or a hydrocarbon group containing 1 to 20 carbon atoms and X is chlorine, bromine or iodine).

The method of producing the polymer (I) is not particularly restricted but said polymer is preferably produced by controlled radical polymerization, in particular by atom transfer radical polymerization.

When the polymer (I) is produced by atom transfer radical polymerization, an alkenyl-containing initiator, in particular an allyl halide, is preferably used as the initiator.

The polymer (I) is also preferably produced by living cationic polymerization and the polymer produced thereby is preferably selected from the group consisting of styrenic polymers, isobutylene polymers, polyether polymers and vinyl ether polymers.

It is preferred, though not requisite, that the polymer (I) is a vinyl polymer, polyolefin polymer, hydrocarbon polymer, polyester polymer, polyether polymer or polysiloxane polymer.

Further, with reference to the polymer to be produced in accordance with the present invention, it is preferred that the polymer (I) have a glass transition temperature of not lower than 25° C. and the polymer chain newly produced by atom transfer radical polymerization with the addition of the polymer (I) have a glass transition temperature of not higher than 25° C. or that the polymer (I) have a glass transition temperature of not higher than 25° C. and the polymer chain produced by atom transfer radical polymerization upon addition of the polymer (I) have a glass transition temperature of not lower than 25° C.

The block copolymer of the present invention is useful as a thermoplastic elastomer or an impact resistance improving agent.

DETAILED DESCRIPTION OF THE INVENTION

The present invention is concerned with a block copolymer produced by addition of a polymer (I) having at least one terminal alkenyl group to a living radical polymerization system or living cationic polymerization system.

Description of Polymer (I)

The terminal alkenyl group of the polymer (I) is not restricted but is preferably one represented by the general formula 1:

$$H_2C=C(R^1)- \quad (1)$$

(wherein $R^1$ is a hydrogen atom or a hydrocarbon group containing 1 to 20 carbon atoms).

In the general formula 1, $R^1$ is a hydrogen atom or a hydrocarbon group containing 1 to 20 carbon atoms, specifically including, for example, the following groups:

$-(CH_2)_n-CH_3$, $-CH(CH_3)-(CH_2)_n-CH_3$, $-CH(CH_2CH_3)-(CH_2)_n-CH_3$, $-CH(CH_2CH_3)_2$, $-C(CH_3)_2-(CH_2)_n-CH_3$, $-C(CH_3)(CH_2CH_3)-(CH_2)_n-CH_3$, $-C_6H_5$, $-C_6H_5(CH_3)$, $-C_6H_5(CH_3)_2$, $-(CH_2)_n-C_6H_5$, $-(CH_2)_n-C_6H_5(CH_3)$, $-(CH_2)_n-C_6H_5(CH_3)_2$ (wherein n is an integer not smaller than 0 and the total number of carbon atoms in each group is not greater than 20).

Among these, a hydrogen atom is preferred.

Furthermore, it is preferred, through not requisite, that the terminal alkenyl group in polymer (I) be not activated by a carbonyl or alkenyl group or aromatic ring conjugated with the carbon-carbon double bond thereof.

The mode of bonding between the alkenyl group and the main chain of the polymer (I) is not particularly restricted but is preferably of the carbon-carbon, ester, ether carbonate, amide, urethane or like bonding type.

The position of the alkenyl group in polymer (I) is not particularly restricted but may be at the terminus or in the middle of the main chain. In accordance with the present invention, straight-chain block copolymers can be synthesized when said group is at the terminus and, when it is in the middle of the main chain, branched block copolymers ramifying from that site can be synthesized.

The number of alkenyl groups in polymer (I) is not particularly restricted but may be selected depending on the structure of the desired block copolymer. Thus, said polymer may have one, two or more alkenyl groups.

The molecular weight distribution, namely the ratio of weight average molecular weight to number average molecular weight as determined by gel permeation chromatography, in the polymer (I) of the present invention is not particularly restricted but is preferably less than 1.8, more preferably not more than 1.7, still more preferably not more than 1.6, much more preferably not more than 1.5, in particular not more than 1.4, most preferably not more than 1.3. In the practice of the present invention, the number average molecular weight can be determined by GPC generally using chloroform as mobile phase and a polystyrene gel column and thus it can be expressed in terms of polystyrene equivalent.

The number average molecular weight of the polymer (I) of the present invention is not particularly restricted but is preferably within the range of 500 to 1,000,000, more preferably within the range of 1,000 to 100,000.

Where the polymer (I) is already a block copolymer, block copolymers composed of three or more polymer blocks can readily be obtained. In that case, mechanical and physical properties and/or refractive index adjustment can effectively be accomplished.

The production of polymer (I) is described later herein.

Living Radical Polymerization

The living radical polymerization system, one of the polymerization systems to which the polymer (I) is to be added for producing block copolymers, is now described in the following.

Prior to describing the living radical polymerization, mention is made of radical polymerization.

Methods of radical polymerization can be classified into "ordinary radical polymerization methods", which comprise simply copolymerizing a monomer having a specific functional group with a vinyl monomer using an azo compound, peroxide or other polymerization initiator, and "controlled radical polymerization methods" which enable introduction of a specific functional group at a terminus or some other controlled site.

Although simple and easy to perform, "ordinary radical polymerization methods" allows introduction of the specific functional group-containing monomer into the polymer only in the manner defined by probabilities. Therefore, for obtaining a polymer with a high functionalization percentage, this monomer is required in a considerably large amount. If, conversely, this monomer is used in a smaller amount, there arises the problem of the increase in the proportion of polymer molecules in which said specific functional group has not been introduced. Another problem is that only those polymers which have a broad molecular weight distribution and a high viscosity can be obtained since it is free radical polymerization.

"Controlled radical polymerization methods" can further be classified into "chain transfer agent methods" which comprise carrying out the polymerization using a chain transfer agent having a specific functional group to give functional group-terminated vinyl polymers and "living radical polymerization methods" by which polymers having a molecular weight almost as designed can be obtained as a result of the termini of growing polymers growing without undergoing termination or a like reaction.

"Chain transfer agent methods" can provide polymers with a high functionalization percentage. It is necessary, however, to use a chain transfer agent having a specific functional group in a considerably large amount as compared with an initiator, whereby an economic problem arises, which is involved in the step of treatment as well. In addition, like the "ordinary radical polymerization methods" mentioned above, they are free radical polymerization methods by nature, so that it is a problem that only polymers having a broad molecular weight distribution and a high viscosity are obtained.

Differing from those methods, the "living radical polymerization methods" hardly undergo termination reaction and give polymers narrow in molecular weight distribution (Mw/Mn being about 1.1 to 1.5) and the molecular weight can arbitrarily be controlled by means of the charge ratio between the monomer and initiator, although they involve a radical polymerization regarded as difficult to control because of a high rate of reaction and a tendency toward termination resulting from coupling of radicals with each other, among others.

Therefore, "living radical polymerization methods", which enable introduction of a specific functional group-containing monomer into a polymer at a substantially arbitrary site thereof in addition to obtaining polymers with a narrow molecular weight distribution and a low viscosity, are more preferred as methods of producing the above-mentioned specific functional group-containing vinyl polymers.

In its narrow sense, the term "living polymerization" means that polymerization in which the molecular chain grows while a terminus always retain activity. Generally, however, it also includes, within the meaning thereof, pseudoliving polymerization in which molecules grow while terminally inactivated molecules and terminally activated ones are in equilibrium. The latter definition is to be applied to the present invention.

"Living radical polymerization methods" have recently been aggressively investigated by a number of groups. As examples, there may be mentioned, among others, the method which uses cobalt porphyrin complex, as shown in the Journal of the American Chemical Society, 1994, vol.116, page 7943, the method which uses a radical capping agent, for example a nitroxide compound, as shown in Macromolecules, 1994, vol. 27, page 7228, and "atom transfer radical polymerization (ATRP)" in which an organic halide, for instance, is used as an initiator and a transition metal complex as a catalyst.

Among such "living radical polymerization methods", the "atom transfer polymerization methods" for polymerizing vinyl monomers using an organic halide, sulfonyl halide or the like as an initiator and a transition metal complex as a catalyst are more preferred as the method of producing specific functional group-containing vinyl polymers, since, in addition to the characteristic features of the above-mentioned "living radical polymerization methods", halogen, etc., relatively favorable for functional group conversion reactions is contained at its terminus and the degree of freedom is high in designing the initiator or catalyst. Such atom transfer radical polymerization methods are described, for example, in Matyjaszewski et al., the Journal of the American Chemical Society, 1995, vol. 117, page 5614; Macromolecues, 1995, vol. 28, page 7901; Science, 1996, vol. 272, page 866; WO 96/30421; WO 97/18247; WO 98/01480; WO 98/40415; Sawamoto et al., Macromolecules, 1995, vol. 28, page 1721; Japanese Kokai Publication Hei-09-208616; and Japanese Kokai Publication Hei-08-41117.

In the present invention, there are no particular restrictions as to which of those living radical polymerization methods is to be employed, although the atom transfer radical polymerization methods are preferred.

In the following, the living radical polymerization methods are described in detail. Prior to doing so, one of the controlled radical polymerization methods, namely the method comprising using a chain transfer agent, which can be used for the production of the polymer (I) to be mentioned later herein, is described. The radical polymerization method using a chain transfer agent (telomer) is not particularly restricted but there may be mentioned, among others, the following two techniques by which vinyl polymers having a terminal structure suited for the practice of the present invention can be obtained.

They are the one comprising using a halogenated hydrocarbon as chain transfer agent to obtain halogen-terminated polymers, as disclosed in Japanese Kokai Publication Hei-04-132706, and the one comprising using a hydroxyl-containing mercaptan, hydroxyl-containing polysulfide or the like as a chain transfer agent to obtain hydroxyl-terminated polymers, as disclosed in Japanese Kokai Publication Sho-61-271306, Japanese Patent 2,594,402 and Japanese Kokai Publication Sho-54-47782.

Living radical polymerization is described in the following.

First, the method which uses a radical capping agent, such as a nitroxide compound, is described. In this polymerization, a stable nitroxy free radical (=N—O.) is generally used as a radical capping agent. Such compounds are not restricted but is preferably a 2,2,6,6-substituted-1-piperidinyloxy radical, a 2,2,5,5-substituted-1-pyrrolidinyloxy radical or a cyclic hydroxyamine-derived nitroxy free radical. Suitable substituents are alkyl groups containing not more than four carbon atoms, such as methyl or ethyl. Specific nitroxy free radical compounds are not restricted but include, among others, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-tert-butylamineoxy radical. Such a stable free radical as galvinoxyl free radical may be used in lieu of the nitroxy free radical.

Said radical capping agent is used in combination with a radical generator. It is thought that the reaction product from the radical capping agent and radical generator supposedly acts as a polymerization initiator to thereby cause the polymerization of an addition-polymerizable monomer to proceed. The ratio between the amounts of both is not particularly restricted but the radical initiator is judiciously used in an amount of 0.1 to 10 moles per mole of the radical capping agent.

While various compounds can be used as a radical generator, a peroxide capable of generating a radical under polymerization temperature conditions is preferred. Said peroxide is not restricted but includes, among others, diacyl peroxides such as benzoyl peroxide and lauroyl peroxide; dialkyl peroxides such as dicumyl peroxides and di-t-butyl peroxide; peroxycarbonates such as diisopropyl peroxydicarbonate and bis(4-t-butylcyclohexyl)peroxydicarboante; alkyl peresters such as t-butyl peroxyoctoate and t-butyl peroxybenzoate. In particular, benzoyl peroxide is preferred. Further, such a radical generator as a radical generating azo compound, for example azobisisobutyronitrile, may also be used in lieu of the peroxide.

As reported in Macromolecules, 1995, vol. 28, page 2993, alkoxyamine compounds such as illustrated below may be used in lieu of the combined use of a radical capping agent and a radical generator.

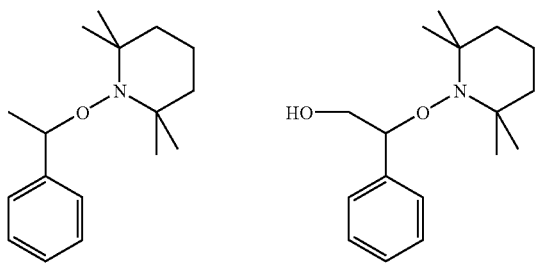

When an alkoxy amine compound is used as an initiator and when said compound is a hydroxyl- or like functional group-containing one such as illustrated above, functional group-terminated polymers are obtained. When this is utilized in the method of the present invention, polymers having a terminal functional group are obtained.

The polymerization conditions, such as monomer, solvent, polymerization temperature, etc., to be used in carrying out the polymerization using the above nitroxide compound or like radical capping agent are not restricted but may be the same as those to be used in the atom transfer radical polymerization described in the following.

<Atom Transfer Radical Polymerization>

The atom transfer radical polymerization methods, which are preferred as living radical polymerization methods to be used in the practice of the present invention, are now described.

In this atom transfer radical polymerization, an organic halide, in particular an organic halide having a highly reactive carbon-halogen bond (e.g. a carbonyl compound having a halogen in α-position or a compound having a halogen at the benzyl site), or a sulfonyl halide compound is used as an initiator. Specific examples are, among others:

$C_6H_5$—$CH_2X$, $C_6H_5$—$C(H)(X)CH_3$, $C_6H_5$—$C(X)(CH_3)_2$ (in the above chemical formulas, $C_6H_5$ is a phenyl group and X is chlorine, bromine or iodine);

$R^3$—$C(H)(X)$—$CO_2R^4$, $R^3$—$C(CH_3)(X)$—$CO_2R^4$, $R^3$—$C(H)(X)$—$C(O)R^4$, $R^3$—$C(CH_3)(X)$—$C(O)R^4$ (in which $R^3$ and $R^4$ each is a hydrogen atom or an alkyl group having 1 to 20 carbon atoms, aryl group or aralkyl group and X is chlorine, bromine or iodine); and $R^3$—$C_6H_4$—$SO_2X$ (in which $R^3$ is a hydrogen atom or an alkyl group having 1 to 20 carbon atoms, aryl group or aralkyl group and X is chlorine, bromine or iodine).

An organic halide or sulfonyl halide having a functional group other than the functional group for initiating polymerization may be used as the initiator in atom transfer radical polymerization. In such case, vinyl polymers having the functional group at one main chain terminus and the growing terminal structure for atom transfer radical polymerization at the other main chain terminus are obtained. As such functional group, there may be mentioned alkenyl, crosslinking silyl, hydroxyl, epoxy, amino and amide groups, among others.

The alkenyl-containing organic halide is not restricted but may be one having the structure shown by the general formula 4:

(wherein $R^5$ is a hydrogen atom or a methyl group, $R^6$ and $R^7$ each is a hydrogen atom or a monovalent alkyl having 1 to 20 carbon atoms, aryl or aralkyl group and $R^6$ and $R^7$ may be bound to each other at respective other termini, $R^8$ is —C(O)O— (ester group), —C(O)— (keto group) or an o-, m- or p-phenylene group, $R^9$ is a direct bond or a divalent organic group having 1 to 20 carbon atoms, which may optionally contain one or more ether bonds, and X is chlorine, bromine or iodine.

As specific examples of the substituents $R^6$ and $R^7$, there may be mentioned hydrogen, methyl, ethyl, n-propyl, iso-propyl, butyl, pentyl, hexyl, etc. $R^6$ and $R^7$ may be bound to each other at respective other termini to form a cyclic skeleton.

As specific examples of the alkenyl-containing organic halide represented by the general formula 4, there may be mentioned the following:

$XCH_2C(O)O(CH_2)_nCH$=$CH_2$,
$H_3CC(H)(X)C(O)O(CH_2)_nCH$=$CH_2$,
$(H_3C)_2C(X)C(O)O(CH_2)_nCH$=$CH_2$,
$CH_3CH_2C(H)(X)C(O)O(CH_2)_nCH$=$CH_2$

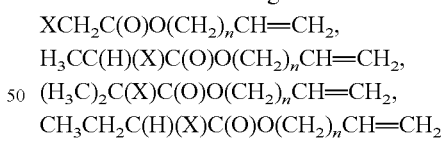

(in the above formulas, X is chlorine, bromine or iodine and n is an integer of 0 to 20);

$XCH_2C(O)O(CH_2)_nO(CH_2)_mCH$=$CH_2$,
$H_3CC(H)(X)C(O)O(CH_2)_nO(CH_2)_mCH$=$CH_2$,
$(H_3C)_2C(X)C(O)O(CH_2)_nO(CH_2)_mCH$=$CH_2$,
$CH_3CH_2C(H)(X)C(O)O(CH_2)_nO(CH_2)_mCH$=$CH_2$,

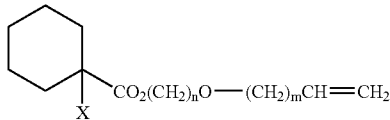

(in the above formulas, X is chlorine, bromine or iodine, n is an integer of 1 to 20, and m is an integer of 0 to 20);
o,m,p-XCH$_2$—C$_6$H$_4$—(CH$_2$)$_n$—CH═CH$_2$,
o,m,p-CH$_3$C(H)(X)—C$_6$H$_4$—(CH$_2$)$_n$—CH═CH$_2$,
o,m,p-CH$_3$CH$_2$C(H)(X)—C$_6$H$_4$—(CH$_2$)$_n$—CH═CH$_2$, (in the above formulas, X is chlorine, bromine or iodine and n is an integer of 0 to 20);
o,m,p-XCH$_2$—C$_6$H$_4$—(CH$_2$)$_n$—O—(CH$_2$)$_m$—CH═CH$_2$,
o,m,p-CH$_3$C(H)(X)—C$_6$H$_4$—(CH$_2$)$_n$—O—(CH$_2$)$_m$—CH═CH$_2$,
o,m,p-CH$_3$CH$_2$C(H)(X)—C$_6$H$_4$—(CH$_2$)$_n$—O—(CH$_2$)$_m$—CH═CH$_2$, (in the above formulas, X is chlorine, bromine or iodine, n is an integer of 1 to 20, and m is an integer of 0 to 20);
o,m,p-XCH$_2$—C$_6$H$_4$—O—(CH$_2$)$_n$—CH═CH$_2$,
o,m,p-CH$_3$C(H)(X)—C$_6$H$_4$—O—(CH$_2$)$_n$—CH═CH$_2$,
o,m,p-CH$_3$CH$_2$C(H)(X)—C$_6$H$_4$—O—(CH$_2$)$_n$—CH═CH$_2$, (in the above formulas, X is chlorine, bromine or iodine and n is an integer of 0 to 20);
o,m,p-XCH$_2$—C$_6$H$_4$—O—(CH$_2$)$_n$—O—(CH$_2$)$_m$—CH═CH$_2$,
o,m,p-CH$_3$C(H)(X)—C$_6$H$_4$—O—(CH$_2$)$_n$—O—(CH$_2$)$_m$—CH═CH$_2$,
o,m,p-CH$_3$CH$_2$C(H)(X)—C$_6$H$_4$—O—(CH$_2$)$_n$—O—(CH$_2$)$_m$—CH═CH$_2$, (in the above formulas, X is chlorine, bromine or iodine, n is an integer of 1 to 20 and m is an integer of 0 to 20).

As the alkenyl-containing organic halide, there may further be mentioned compounds represented by the general formula 5:

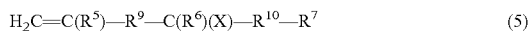

(wherein R$^5$, R$^6$, R$^7$, R$^9$ and X are defined above and R$^{10}$ is a direct bond, —C(O)O— (ester group), —C(O)— (keto group) or an o-, m- or p-phenylene group).

R$^9$ is a direct bond or a divalent organic group having 1 to 20 carbon atoms (which may contain one or more ether bonds) and, when it is a direct bond, the vinyl group is bound to the carbon to which the halogen is bound, to form an allyl halide. In this case, the carbon-halogen bond is activated by the neighboring vinyl group, so that it is not always necessary for R$^{10}$ to be a C(O)O group or a phenylene group, for instance, but it may be a direct bond. When R$^9$ is not a direct bond, R$^{10}$ is preferably a C(O)O group, C(O) group or phenylene group so that the carbon-halogen bond may be activated.

As a specific example of compounds represented by the general formula 5, there can be mentioned,
CH$_2$═CHCH$_2$X, CH$_2$═C(CH$_3$)CH$_2$X,
CH$_2$═CHC(H)(X)CH$_3$, CH$_2$═C(CH$_3$)C(H)(X)CH$_3$,
CH$_2$═CHC(X)(CH$_3$)$_2$, CH$_2$═CHC(H)(X)C$_2$H$_5$,
CH$_2$═CHC(H)(X)CH(CH$_3$)$_2$,
CH$_2$═CHC(H)(X)C$_6$H$_5$, CH$_2$═CHC(H)(X)CH$_2$C$_6$H$_5$,
CH$_2$═CHCH$_2$C(H)(X)—CO$_2$R,
CH$_2$═CH(CH$_2$)$_2$C(H)(X)—CO$_2$R,
CH$_2$═CH(CH$_2$)$_3$C(H)(X)—CO$_2$R,
CH$_2$═CH(CH$_2$)$_8$C(H)(X)—CO$_2$R,
CH$_2$═CHCH$_2$C(H)(X)—C$_6$H$_5$,
CH$_2$═CH(CH$_2$)$_2$C(H)(X)—C$_6$H$_5$,
CH$_2$═CH(CH$_2$)$_3$C(H)(X)—C$_6$H$_5$, (in the above formulas, X is chlorine, bromine or iodine, and R is an alkyl group having 1 to 20 carbon atoms, aryl group or aralkyl group)

Specific examples of the alkenyl-containing sulfonyl halide are as follows:
o-, m- or p-CH$_2$═CH—(CH$_2$)$_n$—C$_6$H$_4$—SO$_2$X and
o-, m- or p-CH$_2$═CH—(CH$_2$)$_n$—O—C$_6$H$_4$—SO$_2$X (wherein, in each formula, X is chlorine, bromine or iodine and n is an integer of 0 to 20), among others.

The above-mentioned crosslinking silyl-containing organic halide is not particularly restricted but includes, among others, those having a structure shown by the general formula 6:

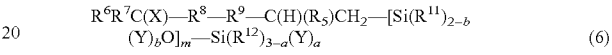

(wherein R$^5$, R$^6$, R$^7$, R$^8$, R$^9$ and X are as defined above, R$^{11}$ and R$^{12}$ each is an alkyl group having 1 to 20 carbon atoms, aryl or aralkyl group, or a triorganosiloxy group represented by (R')$_3$SiO— (in which R' is a monovalent hydrocarbon group having 1 to 20 carbon atoms and the three R' groups may be the same or different) and, when there are two or more R$^{11}$ and/or R$^{12}$ groups, they may be the same or different, Y represents a hydroxyl group or a hydrolyzable group and, when there are two or more Y groups, they may be the same or different, a represents 0, 1, 2 or 3, b represents 0, 1 or 2 and m is an integer of 0 to 19, provided that the relation a+mb≧1 should be satisfied.

As a specific example of compounds represented by the general formula 6, there can be mentioned,
XCH$_2$C(O)O(CH$_2$)$_n$Si(OCH$_3$)$_3$, CH$_3$C(H)(X)C(O)O(CH$_2$)$_n$Si(OCH$_3$)$_3$,
(CH$_3$)$_2$C(X)C(O)O(CH$_2$)$_n$Si(OCH$_3$)$_3$, XCH$_2$C(O)O(CH$_2$)$_n$Si(CH$_3$)(OCH$_3$)$_2$,
CH$_3$C(H)(X)C(O)O(CH$_2$)$_n$Si(CH$_3$)(OCH$_3$)$_2$,
(CH$_3$)$_2$C(X)C(O)O(CH$_2$)$_n$Si(CH$_3$)(OCH$_3$)$_2$, (wherein, in each formula, X is chlorine, bromine or iodine and n is an integer of 0 to 20),
XCH$_2$C(O)O(CH$_2$)$_n$O(CH$_2$)$_m$Si(OCH$_3$)$_3$,
H$_3$CC(H)(X)C(O)O(CH$_2$)$_n$O(CH$_2$)$_m$Si(OCH$_3$)$_3$,
(H$_3$C)$_2$C(X)C(O)O(CH$_2$)$_n$O(CH$_2$)$_m$Si(OCH$_3$)$_3$,
CH$_3$CH$_2$C(H)(X)C(O)O(CH$_2$)$_n$O(CH$_2$)$_m$Si(OCH$_3$)$_3$,
XCH$_2$C(O)O(CH$_2$)$_n$O(CH$_2$)$_m$Si(CH$_3$)(OCH$_3$)$_2$,
H$_3$CC(H)(X)C(O)O(CH$_2$)$_n$O(CH$_2$)$_m$—Si(CH$_3$)(OCH$_3$)$_2$,
(H$_3$C)$_2$C(X)C(O)O(CH$_2$)$_n$O(CH$_2$)$_m$—Si(CH$_3$)(OCH$_3$)$_2$,
CH$_3$CH$_2$C(H)(X)C(O)O(CH$_2$)$_n$O(CH$_2$)$_m$—Si(CH$_3$)(OCH$_3$)$_2$, (wherein, in each formula, X is chlorine, bromine or iodine, n is an integer of 0 to 20, and m is an integer of 0 to 20),
o,m,p-XCH$_2$—C$_6$H$_4$—(CH$_2$)$_2$Si(OCH$_3$)$_3$,
o,m,p-CH$_3$C(H)(X)—C$_6$H$_4$—(CH$_2$)$_2$Si(OCH$_3$)$_3$,
o,m,p-CH$_3$CH$_2$C(H)(X)—C$_6$H$_4$—(CH$_2$)$_2$Si(OCH$_3$)$_3$,
o,m,p-XCH$_2$—C$_6$H$_4$—(CH$_2$)$_3$Si(OCH$_3$)$_3$,
o,m,p-CH$_3$C(H)(X)—C$_6$H$_4$—(CH$_2$)$_3$Si(OCH$_3$)$_3$,
o,m,p-CH$_3$CH$_2$C(H)(X)—C$_6$H$_4$—(CH$_2$)$_3$Si(OCH$_3$)$_3$,
o,m,p-XCH$_2$—C$_6$H$_4$—(CH$_2$)$_2$—O—(CH$_2$)$_3$Si(OCH$_3$)$_3$,
o,m,p-CH$_3$C(H)(X)—C$_6$H$_4$—(CH$_2$)$_2$—O—(CH$_2$)$_3$Si(OCH$_3$)$_3$,
o,m,p-CH$_3$CH$_2$C(H)(X)—C$_6$H$_4$—(CH$_2$)$_2$—O—(CH$_2$)$_3$Si(OCH$_3$)$_3$, o,m,p-XCH$_2$—C$_6$H$_4$—O—(CH$_2$)$_3$Si(OCH$_3$)$_3$,
o,m,p-CH$_3$C(H)(X)—C$_6$H$_4$—O—(CH$_2$)$_3$Si(OCH$_3$)$_3$,
o,m,p-CH$_3$CH$_2$C(H)(X)—C$_6$H$_4$—O—(CH$_2$)$_3$—Si(OCH$_3$)$_3$,
o,m,p-XCH$_2$—C$_6$H$_4$—O—(CH$_2$)$_2$—O—(CH$_2$)$_3$—Si(OCH$_3$)$_3$,
o,m,p-CH$_3$C(H)(X)—C$_6$H$_4$—O—(CH$_2$)$_2$—O—(CH$_2$)$_3$Si(OCH$_3$)$_3$,
o,m,p-CH$_3$CH$_2$C(H)(X)—C$_6$H$_4$—O—(CH$_2$)$_2$—O—(CH$_2$)$_3$Si(OCH$_3$)$_3$, (wherein, in each formula, X is chlorine, bromine or iodine).

As further examples of the crosslinking silyl-containing organic halide, there may be mentioned those having a structure represented by the general formula 7.

$$(R^{12})_{3-a}(Y)_a Si—[OSi(R^{11})_{2-b}(Y)_b]_m—CH_2—C(H)(R^5)—R^9—C(R^6)(X)—R^{10}—R^7 \qquad (7)$$

(wherein R$^5$, R$^6$, R$^7$, R$^9$, R$^{10}$, R$^{11}$, R$^{12}$, a, b, m, X and Y are as defined above).

As a specific example of such compounds, there can be mentioned;
(CH$_3$O)$_3$SiCH$_2$CH$_2$C(H)(X)C$_6$H$_5$, (CH$_3$O)$_2$(CH$_3$)SiCH$_2$CH$_2$C(H)(X)C$_6$H$_5$,
(CH$_3$O)$_3$Si(CH$_2$)$_2$C(H)(X)—CO$_2$R, (CH$_3$O)$_2$(CH$_3$)Si(CH$_2$)$_2$C(H)(X)—CO$_2$R,
(CH$_3$O)$_3$Si(CH$_2$)$_3$C(H)(X)—CO$_2$R, (CH$_3$O)$_2$(CH$_3$)Si(CH$_2$)$_3$C(H)(X)—CO$_2$R,
(CH$_3$O)$_3$Si(CH$_2$)$_4$C(H)(X)—CO$_2$R, (CH$_3$O)$_2$(CH$_3$)Si(CH$_2$)$_4$C(H)(X)—CO$_2$R,
(CH$_3$O)$_3$Si(CH$_2$)$_9$C(H)(X)—CO$_2$R, (CH$_3$O)$_2$(CH$_3$)Si(CH$_2$)$_9$C(H)(X)—CO$_2$R,
(CH$_3$O)$_3$Si(CH$_2$)$_3$C(H)(X)—C$_6$H$_5$, (CH$_3$O)$_2$(CH$_3$)Si(CH$_2$)$_3$C(H)(X)—C$_6$H$_5$,
(CH$_3$O)$_3$Si(CH$_2$)$_4$C(H)(X)—C$_6$H$_5$, (CH$_3$O)$_2$(CH$_3$)Si(CH$_2$)$_4$C(H)(X)—C$_6$H$_5$, (wherein, in each formula, X is chlorine, bromine or iodine, R is an alkyl group having 1 to 20 carbon atoms, aryl group, or aralkyl group.), and the like.

The above-mentioned hydroxyl-containing organic halide or sulfonyl halide is not particularly restricted but includes compounds represented by the following formula:

HO—(CH$_2$)$_n$—OC(O)C(H)(R)(X)

(wherein X is chlorine, bromine or iodine, R is a hydrogen atom or an alkyl having 1 to 20 carbon atoms, aryl or aralkyl group and n is an integer of 1 to 20).

The above-mentioned amino-containing organic halide or sulfonyl halide is not particularly restricted but includes compounds represented by the following formula:

H$_2$N—(CH$_2$)$_n$—OC(O)C(H)(R)(X)

(wherein X is chlorine, bromine or iodine, R is a hydrogen atom or an alkyl group having 1 to 20 carbon atoms, aryl or aralkyl group and n is an integer of 1 to 20).

The above-mentioned epoxy-containing organic halide or sulfonyl halide is not particularly restricted but includes compounds represented by the following formula:

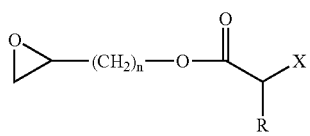

(wherein X is chlorine, bromine or iodine, R is a hydrogen atom or an alkyl group having 1 to 20 carbon atoms, aryl or aralkyl group and n is an integer of 1 to 20).

For obtaining polymers having two or more terminal structures specified by the present invention within each molecule, an organic halide or sulfonyl halide having two or more initiation sites is preferably used. Specific examples are:

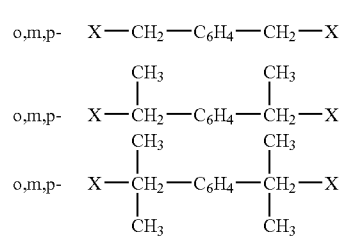

(in which C$_6$H$_4$ represents a phenylene group and X is chlorine, bromine or iodine);

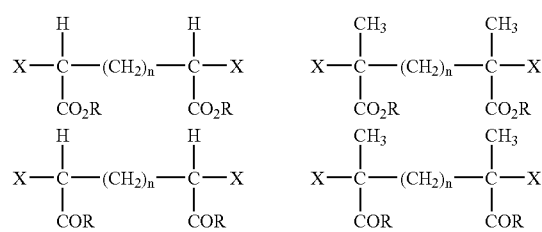

(in which R is an alkyl group having 1 to 20 carbon atoms, aryl or aralkyl group, n is an integer of 0 to 20 and X is chlorine, bromine or iodine);

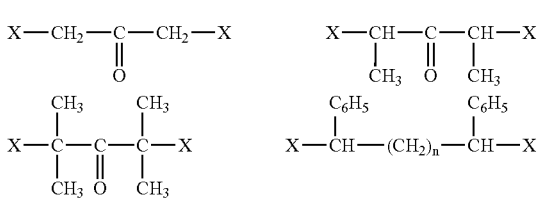

(in which X is chlorine, bromine or iodine and n is an integer of 0 to 20);

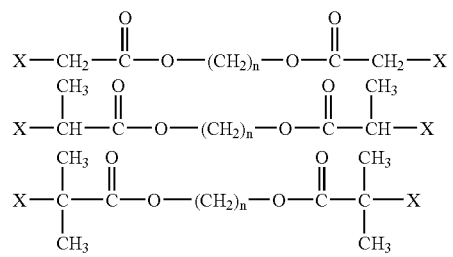

(in which n is an integer of 0 to 20 and X is chlorine, bromine or iodine);

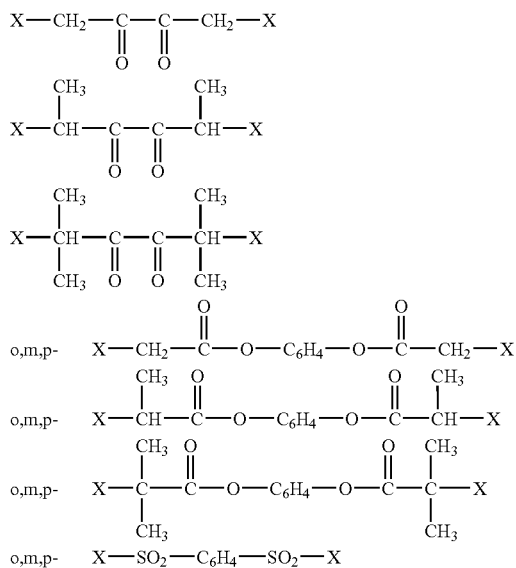

o,m,p-  X—SO$_2$—C$_6$H$_4$—SO$_2$—X (in which X is chlorine, bromine or iodine), and the like.

The vinyl monomer to be used in this polymerization is not particularly restricted but those specifically mentioned later herein all can judiciously be used.

The transition metal complex to be used as a polymerization catalyst is not particularly restricted but preferably is a metal complex containing an element of the group 7, 8, 9, 10 or 11 of the periodic table as a central metal. More preferred are complexes of copper (valence: zero), monovalent copper, divalent ruthenium, divalent iron or divalent nickel. Among them, copper complexes are preferred. Specific examples of monovalent copper compounds are cuprous chloride, cuprous bromide, cuprous iodide, cuprous cyanide, cuprous oxide, cuprous perchlorate and the like. When a copper compound is used, a ligand, such as 2,2'-bipyridyl or a derivative thereof, 1,10-phenanthroline or a derivative thereof or a polyamine such as tetramethylethylenediamine, pentamethyldiethylenetriamine or hexamethyltris(2-aminoethyl)amine, is added to enhance the catalytic activity. A tristriphenylphosphine complex of divalent ruthenium chloride (RuCl$_2$(PPh$_3$)$_3$) is also suited for use as a catalyst. When a ruthenium compound is used as a catalyst, an aluminum alkoxide is added as an activator. Furthermore, a bistriphenylphosphine complex of divalent iron (FeCl$_2$(PPh$_3$)$_2$), a bistriphenylphosphine complex of divalent nickel (NiCl$_2$(PPh$_3$)$_2$) and a bistributylphosphine complex of divalent nickel (NiBr$_2$(PBu$_3$)$_2$) are also suited as a catalysts.

The polymerization can be carried out in the absence or presence of various solvents. As the solvent species, there may be mentioned, among others, hydrocarbon solvents such as benzene and toluene, ether solvents such as diethyl ether and tetrahydrofuran, halogenated hydrocarbon solvents such as methylene chloride and chloroform, ketone solvents such as acetone, methyl ethyl ketone and methyl isobutyl ketone, alcohol solvents such as methanol, ethanol, propanol, isopropanol, n-butyl alcohol and tert-butyl alcohol, nitrile solvents such as acetonitrile, propionitrile and benzonitrile, ester solvents such as ethyl acetate and butyl acetate, and carbonate solvents such as ethylene carbonate and propylene carbonate. These may be used singly or two or more of them may be used in admixture. The polymerization can be conducted within the temperature range of 0° C. to 200° C., preferably 50° C. to 150° C., although said range is not limited.

<Production of Multiblock Copolymers by Living Radical Polymerization>

When, in an atom transfer radical polymerization system, the polymer (I) has a group capable of serving as an initiator group for atom transfer radical polymerization, the block copolymer produced can be a multiblock copolymer. The group of the polymer (I) to serve as an initiator group in atom transfer radical polymerization is not particularly restricted but is preferably one represented by the general formula 2 or the general formula 3:

—C(Ar)(R$^2$)(X)  (2)

(wherein Ar is an aryl group, which may optionally have a substituent, R$^2$ is a hydrogen atom or a hydrocarbon group having 1 to 20 carbon atoms and X is chlorine, bromine or iodine);

—C(CO$_2$R)(R$^2$)(X)  (3)

(wherein Ar is an aryl group, which may optionally have a substituent, R$^2$ is a hydrogen atom or a methyl group, R is an organic group having 1 to 20 carbon atoms and X is chlorine, bromine or iodine).

In the general formula 2 and 3, R$^2$ is preferably a hydrogen atom, although this is not restricted. When, in the general formula 2, Ar has a substituent, the substituent is not particularly restricted but include, among others, halogens and saturated or unsaturated hydrocarbon groups having 1 to 20 carbon atoms.

<Monomers in Living Radical Polymerization>

The vinyl monomer to be used in the living radical polymerization according to the present invention is not particularly restricted but may be any of various ones. Examples are (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, α-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol and so on. These may be used singly or a plurality thereof may be copolymerized. Among them, styrenic monomers and (meth) acrylic monomers are preferred from the viewpoint of physical properties of the products. More preferred are acrylic acid ester monomers and methacrylic acid ester monomers, in particular acrylic acid ester monomers and most preferred are butyl acrylate monomers. In the practice of the present invention, it is necessary for the growing terminus in living radical polymerization to add to the alkenyl group of polymer (I), and the addition activity, which differs according to the structure of said growing terminus, generally decreases in the order of acrylic type terminus, methacrylic type terminus and styrenic type terminus, though this order does not always apply. Therefore, when a monomer capable of enhancing the activity of the growing terminus, for example an acrylic monomer, is added to a polymerization system in which addition, hence block copolymer formation, is difficult to realize, that monomer, when it is at the terminus, tends to add to the alkenyl group with ease, possibly improving the yield of the block copolymer. In the practice of the present invention, such a preferred monomer may be copolymerized with some other monomers and, on that occasion, the content of such preferred monomer is preferably 40% on the weight basis. The term (meth) acrylic acid employed hereinabove means acrylic acid and/or methacrylic acid.

<Addition of Polymer (I) to the Living Radical Polymerization System>

The time for adding the polymer (I) to the living radical polymerization system is not particularly restricted but preferably at the terminal stage of polymerization. The amount of polymer (I) to be added is not particularly restricted but is preferably such that the number of growing termini in the living radical polymerization be equal to the number of termini of the general formula 1 in polymer (I).

The polymer (I) may be added as such or in a dissolved state in a solvent inert to the living radical polymerization.

The time for adding the polymer (I) having an initiator group for atom transfer radical polymerization to the atom transfer radical polymerization system is not particularly restricted but preferably should be adequate to the production of the desired multiblock copolymer. There may be mentioned, for example, the technique already mentioned hereinabove which comprises adding it as an initiator from the initial stage of polymerization, the technique which comprises adding it during polymerization, and the technique which comprises adding it at the point of time of completion of the polymerization and adding simultaneously or later the radical polymerizable monomer again. The point of time of completion of the polymerization is preferably the time point at which not less than 90%, more preferably not less than 99% of the monomer has been polymerized. Mere addition of the polymer (I) having an initiator group for atom transfer radical polymerization after completion of the polymerization hardly results in multiblock formation, and therefore one more addition of the radical polymerizable monomer is required. If this time of addition is too late, the growing terminus of the polymer (I) having an initiator group for atom transfer radical polymerization may possibly add directly to the alkenyl group terminus of another polymer (I) having the initiator group for atom transfer radical polymerization; therefore, care should be taken. The amount of the polymer (I) having an initiator group for atom transfer radical polymerization is not particularly restricted but is preferably such that the number of growing termini in atom transfer radical polymerization be equal to the number of initiator groups for atom transfer radical polymerization which the polymer (I) having the initiator group for atom transfer radical polymerization has and to which said growing termini are to add. When the polymer (I) having an initiator group for atom transfer radical polymerization is used as an initiator for atom transfer radical polymerization from the beginning, the number of alkenyl termini to undergo addition is in principle equal to that of growing termini, as mentioned hereinabove. When another initiator is used, however, the number of growing termini becomes greater by the number of molecules of said initiator. It is therefore desirable to adjust the proportion thereof according to the desired multiblock copolymer.

Living Cationic Polymerization

A living cationic polymerization, which is one of the polymerization systems for producing block copolymers by adding the polymer (I), is described below.

Living cationic polymerization constitutes a technique of polymerization by which the isomerization, chain transfer reaction and termination reaction of the growing carbenium ion, which are problems encountered in cationic polymerization, are controlled and in which the polymerization proceeds apparently without deactivation of the growing terminus. The term "apparently" is used to include the case as well where polymers grow while terminally deactivated molecules and terminally activated molecules are in equilibrium, as in the above-mentioned living radical polymerization. Among reported examples of living cationic polymerization, there are vinyl ether polymerization using a combined initiator comprising hydrogen iodide and iodine (Higashimura et al.: Macromolecules, 17, 265, 1984), and polymerization of an monomeric olefin, such as isobutylene, using an organic carboxylic acid or an ester thereof or an ether as an initiator in combination with a Lewis acid (Kennedy et al.: Japanese Kokai Publication Sho-62-48704; Japanese Kokai Publication Sho-64-62308), among others.

In the practice of the present invention, the living cationic polymerization for producing the desired block copolymer by adding the polymer (I) is not particularly restricted but it comprises polymerizing a cationically polymerizable monomer in the presence of a compound of the following general formula 8:

$$(CR^{13}R^{14}X)_n R^{15} \qquad (8)$$

(wherein X is a substituent selected from a halogen atom, an alkoxy group having 1 to 6 carbon atoms and an acyloxy group, $R^{13}$ and $R^{14}$ may be the same or different and each is a hydrogen atom or a monovalent hydrocarbon group having 1 to 6 carbon atoms, $R^{15}$ is a polyvalent aromatic or aliphatic hydrocarbon group and n is a natural number of 1 to 6).

<Monomers in Living Cationic Polymerization>

The monomer to be used for the living cationic polymerization according to the present invention is not particularly restricted but includes, for example, aliphatic olefins, aromatic vinyls, dienes, vinyl ethers, silanes, vinylcarbazole, β-pinene, acenaphthylene and like monomers. These are used singly or two or more of them are used combinedly. Specific examples of the monomer are shown below. From the viewpoint of physical properties of the product copolymers, isobutylene is preferred among others.

As the aliphatic olefin monomers, there may be mentioned isobutylene, ethylene, propylene, 1-butene, 2-methyl-1-butene, 3-methyl-1-butene, pentene, hexene, cyclohexene, 4-methyl-1-pentene, vinylcyclohexene, octene, norbornene and the like.

As the aromatic vinyl monomers, there may be mentioned styrene, o-, m- or p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-, m- or p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-, m- or p-t-butylstyrene, o-, m- or p-methoxystyrene, o-, m- or p-chloromethylystyrene, o-, m- or p-bromomethylystyrene, silyl-substituted styrene derivatives, indene, vinylnaphthalene and the like.

As the diene monomers, there may be mentioned butadiene, isoprene, cyclopentadiene, cyclohexadiene, dicyclopentadiene, divinylbenzene, ethylidenenorbornene and the like.

As the vinyl ether monomers, there may be mentioned methyl vinyl ether, ethyl vinyl ether, (n-, iso)propyl vinyl ether, (n-, sec-, tert-, iso)butyl vinyl ether, methyl propenyl ether, ethyl propenyl ether and the like.

As the silane compounds, there may be mentioned vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, γ-methacryloyloxy-propyltrimethoxysilane, γ-methacryloyloxypropyl-methyldimethoxysilane and the like.

<Initiator for Living Cationic Polymerization>

The above-mentioned compound of the general formula 8 serves as an initiator and forms a carbon cation in the presence of a Lewis acid and the like, and carbon cation presumably serves as a site of initiation of cationic polymerization. As examples of the compound of the general formula 8 to be used in the present invention, there may be mentioned the following:

(1-chloro-1-methylethyl)benzene
  $C_6H_5C(CH_3)_2Cl$
1,4-bis(1-chloro-1-methylethyl)benzene
  $1,4\text{-}Cl(CH_3)_2CC_6H_4C(CH_3)_2Cl$
1,3-bis(1-chloro-1-methylethyl)benzene
  $1,3\text{-}Cl(CH_3)_2CC_6H_4C(CH_3)_2Cl$
1,3,5-tris(1-chloro-1-methylethyl)benzene
  $1,3,5\text{-}(ClC(CH_3)_2)_3C_6H_3$
1,3-bis(1-chloro-1-methylethyl)-(5-tert)-butylbenzene
  $1,3\text{-}(C(CH_3)_2Cl)_2\text{-}5\text{-}(C(CH_3)_3)C_6H_3$ Particularly preferred among them are bis(1-chloro-1-methylethyl)benzenes $[C_6H_4(C(CH_3)_2Cl)_2]$ (bis(1-chloro-1-methylethyl)benzenes are also called bis(α-chloroisoprpyl) benzenes, bis(2-chloro-2-propyl)benzenes or dicumyl chlorides). These are bifunctional initiators and, when the polymerization is started with these, polymers having growing termini at both ends are obtained and these, upon reaction with the block copolymer (I), readily give block copolymers of the type ABCBA.

<Catalyst for Living Cationic Polymerization>

The polymerization for producing isobutylene-derived block copolymers may be carried out in the presence of a Lewis acid catalyst. Such Lewis acid may be any of those which can be used in cationic polymerization. Suited for use are, for example, metal halides such as $TiCl_4$, $TiBr_4$, $BCl_3$, $BF_3$, $BF_3 \cdot OEt_2$, $SnCl_4$, $SbCl_5$, $SbF_5$, $WCl_6$, $TaCl_5$, $VCl_5$, $FeCl_3$, $ZnBr_2$, $AlCl_3$ and $AlBr_3$; and organometal halides such as $Et_2AlCl$ and $EtAlCl_2$. Considering the catalytic acitivity and commercial availability, $TiCl_4$, $BCl_3$ and $SnCl_4$ are preferred. The amount of the Lewis acid to be used is not particularly restricted but can be selected according to the polymerization characteristics or concentration of the monomer employed. Generally, the catalyst is used in an amount of 0.1 to 100 mole equivalents, preferably 1 to 60 mole equivalents, relative to the compound of the general formula 8.

<Electron-Donating Component in Living Cationic Polymerization>

The polymerization for producing isobutylene-derived block copolymers may also be carried out, when necessary, in the presence of an electron-donating component. Said electron-donating component is considered to have a stabilizing effect on growing carbon cations in cationic polymerization and, upon adding such electron donor, polymers having a controlled structure narrow in molecular weight distribution are formed. The electron-donating component which can be used is not particularly restricted but includes, among others, pyridines, amines, amides, sulfoxides, esters and metal compounds having an oxygen atom bound to the metal atom.

The amount of use of each component can adequately be designed according to the characteristics of the desired polymer. First, the molecular weight of the product polymer can be determined based on the mole equivalent relationship between the cationically polymerizable monomer other than the isobutylenic monomer and isobutylene and the compound of the general formula 8. Generally, designing is made so that the product block copolymer may have a number average molecular weight of about 20,000 to 500,000.

<Polymerization Conditions of Living Cationic Polymerization>

The present invention can be carried out in a solvent, if necessary. Any solvent can be used without any particular limitation provided that it will not substantially inhibit the cationic polymerization. Typically, there may be mentioned halogenated hydrocarbons such as methyl chloride, dichloromethane, chloroform, ethyl chloride, dichloroethane, n-propyl chloride, n-butyl chloride and chlorobenzene; benzene and alkylbenzenes such as toluene, xylene, ethylbenzene, propylbenzene and butylbenzene; straight-chain aliphatic hydrocarbons such as ethane, propane, butane, pentane, hexane, heptane, octane, nonane and decane;

branched aliphatic hydrocarbons such as 2-methylpropane, 2-methylbutane, 2,3,3-trimethylpentane and 2,2,5-trimethylhexane; alicyclic hydrocarbons such cyclohexane, methylcyclohexane and ethylcyclohexane; paraffin oils purified from petroleum fractions by hydrogenation; and the like. Among these, toluene-containing mixed solvents are preferred in view of safety to the environment and polymerization physical properties. Primary and/or secondary monohalogenated hydrocarbons containing 3 to 8 carbon atoms are also preferably used. As specific examples of such that can be used are 1-chloropropane, 1-chloro-2-methylpropane, 1-chlorobutane, 1-chloro-2-methylbutane, 1-chloro-3-methylbutane, 1-chloro-2,2-dimethylbutane, 1-chloro-3,3-dimethylbutane, 1-chloro-2,3-dimethylbutane, 1-chloropentane, 1-chloropentane, 1-chloro-2-methylpentane, 1-chloro-3-methylpentane, 1-chloro-4-methylpentane, 1-chlorohexane, 1-chloro-2-methylhexane, 1-chloro-3-methylhexane, 1-chloro-4-methylhexane, 1-chloro-5-methylhexane, 1-chloroheptane, 1-chlorooctane, 2-chloropropane, 2-chlorobutane, 2-chloropentane, 2-chlorohexane, 2-chloroheptane, 2-chlorooctane and chlorobenzene. These may be used singly or two or more of them may be used in combination. Among them, 1-chlorobutane is preferred from the viewpoint of equilibrium among solubility of isobutylene-derived block copolymers, ease of decomposition for rendering the same nonhazardous, cost and other factors.

These solvents are used singly or in combination considering the balance between the polymerization characteristics of the monomers constituting the block copolymer and the solubility of the product polymer, for instance. The amount of solvent to be used is selected, considering the viscosity of the polymer solution to be obtained and the ease of removal of heat, so that the polymer concentration may be 1 to 50% by weight, preferably 5 to 35% by weight.

In practicing the polymerization, the respective components are mixed up with cooling, for example at a temperature of −100° C. to not higher than 0° C. A particularly preferred temperature range for attaining a balance between the cost of energy and the stability of polymerization is −30° C. to −80° C.

<Production of Multiblock Copolymers by Living Cationic Polymerization>

In cases where, in the living cationic polymerization system of the present invention, the polymer (I) has a group capable of serving as an initiator for living cationic polymerization, then the product block copolymer can be a multiblock copolymer. The group which can serve as an initiator group for living cationic polymerization in said polymer (I) is not restricted but is preferably one represented by the general formula 2:

(wherein Ar is an aryl group, which may have a substituent, $R^2$ is a hydrogen atom or a hydrocarbon group having 1 to 20 carbon atoms and X is chlorine, bromine or iodine).

<Addition of Polymer (I) to the Living Cationic Polymerization System>

The time for adding the polymer (I) to the living cationic polymerization system is not particularly restricted but is preferably in the terminal stage of polymerization. According to the production method employed, the polymer (I) may have a cationically active terminal halogen group. For example, there can be mentioned the case with the atom transfer radical polymerization using an allyl halide as an initiator to produce the polymer (I). In that case, it is possible that cationic polymerization starts from that site. Also in cases where such is to be avoided, the addition should preferably be made at the final stage of polymerization where the monomer remains little.

The amount of the polymer (I) to be added is not particularly restricted but is preferably such that the number of growing termini in living cationic polymerization be equal to the number of alkenyl groups in polymer (I).

The polymer (I) may be added as such or in the form of a solution in a solvent which will not adversely affect the living cationic polymerization.

The time for adding the polymer (I) having an initiator group for living cationic polymerization is not particularly restricted but should be adequate to the production of the desired multiblock copolymer. There may be mentioned, for example, the technique already mentioned hereinabove which comprises adding it as an initiator from the initial stage of polymerization, the technique which comprises adding it during polymerization, and the technique which comprises adding it at the point of time of completion of the polymerization and adding simultaneously or later the cationically polymerizable monomer again. The point of time of completion of the polymerization is preferably the time point at which not less than 90%, more preferably not less than 99% of the monomer has been polymerized. Mere addition of the polymer (I) having an initiator group for living cationic polymerization thereafter hardly results in multiblock formation and one more addition of the cationically polymerizable monomer is required. If this time of addition is too late, the terminus of the general formula 2 of the polymer (I) having an initiator group for living cationic polymerization may possibly add directly to the alkenyl group; therefore, care should be taken. The amount of the polymer (I) having an initiator group for living cationic polymerization is not particularly restricted but is preferably such that the number of growing termini in living cationic polymerization be equal to the number of alkenyl groups in the polymer (I) to which said growing termini are to add. When the polymer (I) having an initiator group for living cationic polymerization is used as an initiator from the beginning, both numbers are in principle equal to that of each other, as already mentioned hereinabove. When another initiator is used, however, the number of growing termini becomes greater by the number of molecules of said initiator. It is therefore desirable to adjust the proportion thereof according to the desired multiblock copolymer.

Production of Polymer (I)

In the following, the method of producing the alkenyl-containing polymer (I) to be used in accordance with the present invention is described.

<Outline of the Method of Polymerizing the Polymer (I)>

The polymerization method for producing the polymer (I) is not particularly restricted. Said polymer can be synthesized by various techniques of polymerization such as anionic polymerization, cationic polymerization, radical polymerization, coordination polymerization, group transfer polymerization, condensation polymerization and ring opening polymerization. Among them, living polymerization, such as living anionic, polymerization, living cationic polymerization and living radical polymerization, are preferred since it is preferred that the molecular weight and molecular weight distribution be controlled. Among these, living cationic polymerization and living radical polymerization are preferred, living radical polymerization is more preferred, and atom transfer radical polymerization is particularly preferred, but without any limitative meaning.

<Outline of the Main Chain of Polymer (I)>

The main chain of polymer (I) according to the present invention is not particularly restricted but includes polyester polymers, polyether polymers, vinyl polymers, (meth)acrylic polymers, polysiloxane polymers, hydrocarbon polymers, polycarbonate polymers, polyarylate polymers, diallyl phthalate polymers, polyamide polymers and polyimide polymers, among others.

<Outline of Terminal Functional Group Introduction>

The alkenyl group introduction into the polymer can be effected by various methods that have so far been proposed. These methods can be roughly classified into two groups; in one group, the alkenyl group introduction is carried out after polymerization and, in the other, the alkenyl group introduction is carried out during polymerization. In cases where the alkenyl group introduction is effected after polymerization, an alkenyl group can be introduced, for example, into a terminus, the main chain or a side chain of an organic polymer having a functional group, such as a hydroxyl or alkoxide group, at a terminus, in the main chain or in a side chain by reacting said polymer with an organic alkenyl-containing compound having an active group reactive with said functional group. As examples of said organic alkenyl-containing compound having an active group reactive with the above-mentioned functional group, there may be mentioned unsaturated fatty acids having 3 to 20 carbon atoms, acid halides, acid anhydrides, such as acrylic acid, methacrylic acid, vinylacetic acid, acryloyl chloride and acryloyl bromide; unsaturated fatty acid-substituted carbonic acid halides having 3 to 20 carbon atoms such as allyl chloroformate ($CH_2$=$CHCH_2OCOCl$) and allyl bromoformate ($CH_2$=$CHCH_2OCOBr$); allyl chloride, allyl bromide, vinyl(chloromethyl)benzene, allyl(chloromethyl)benzene, vinyl(bromomethyl)benzene, allyl(bromomethyl)benzene, allyl chloromethyl ether, allyl(chloromethoxy)benzene, 1-butenyl chloromethyl ether, 1-hexenyl(chloromethoxy)benzene, allyloxy(chloromethyl)benzene and the like.

For effecting alkenyl group introduction during polymerization, alkenyl group introduction into the main chain of a polymer or at a terminus thereof can be realized, for example, by using, in the polymerization by radical polymerization, a vinyl monomer having an alkenyl group low in radical reactivity in the molecule, such as allyl methacylate or allyl acrylate, or a radical chain transfer agent having an alkenyl group low in radical reactivity such as allyl mercaptan.

<Production of Polymer (I) by Controlled Radical Polymerization>

The production of polymer (I) by controlled radical polymerization is now described in the following.

The controlled radical polymerization itself has already been described hereinabove in relation to living radical polymerization. Therefore, the method of alkenyl group introduction and the method of introducing an initiator group for atom transfer radical polymerization are described here.

<Terminal Alkenyl Group Introduction>

Various techniques so far proposed can be used for introducing an akenyl group, preferably a group of the general formula 1, into a polymer. Specific examples are given below under [A] to [C] mainly in relation to vinyl polymers producible by atom transfer radical polymerization. These, however, have no limitative meaning. As for other polymers, they can be synthesized by generally known methods, and the hydroxyl conversion method, for instance, among the methods mentioned below can also be utilized.

[A] Method comprising introducing an alkenyl group directly into the polymer main chain on the occasion of synthesizing a vinyl polymer by radical polymerization.

[B] Method comprising using a vinyl polymer having at least one halogen atom and convering this halogen atom to an alkenyl-containing functional group.

[C] Method comprising using a vinyl polymer having at least one hydroxyl group and converting this hydroxyl group to an alkenyl-containing functional group.

The above synthesis method [A] for introducing an alkenyl group directly into the polymer main chain is not particularly restricted but, specifically, there may be mentioned the following methods [A-a] and [A-b], among others.

[A-a] Method comprising subjecting, in synthesizing a vinyl polymer by living radical polymerization, a compound having a polymerizable alkenyl group and an alkenyl group low in polymerizability in one and the same molecule as represented by the general formula 9:

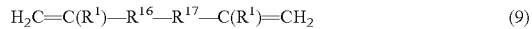

$$H_2C=C(R^1)-R^{16}-R^{17}-C(R^1)=CH_2 \quad (9)$$

(wherein $R^1$ is as defined above and the two of them may be the same or different, $R^{16}$ represents —C(O)O— (ester group) or o-, m- or p-phenylene group and $R^{17}$ represents a direct bond or a divalent organic group having 1 to 20 carbon atoms, which may optionally have one or more ether bonds; when $R^{16}$ is an ester group, said compound is a (meth)acrylate compound and, when $R^{16}$ is a phenylene group, said compound is a styrenic compound), to reaction, together with a predetermined vinyl monomer.

The group $R^{17}$ in the above general formula 9 is not particularly restricted but includes, among others, alkylene groups such as methylene, ethylene and propylene; o-, m- or p-phenylene group; aralkyl groups such as benzyl; and alkylene groups containing an ether bond, such as —$CH_2CH_2$—O—$CH_2$— and —O—$CH_2$—.

Among the compounds represented by the general formula 9, the following compounds are preferred because of their ready availability.

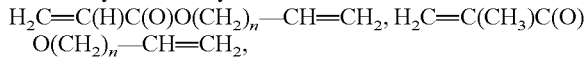

$H_2C$=$C(H)C(O)O(CH_2)_n$—$CH$=$CH_2$, $H_2C$=$C(CH_3)C(O)O(CH_2)_n$—$CH$=$CH_2$, (wherein, in each formula, n represents an integer of 0 to 20);

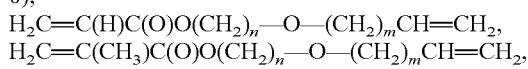

$H_2C$=$C(H)C(O)O(CH_2)_n$—O—$(CH_2)_m CH$=$CH_2$,
$H_2C$=$C(CH_3)C(O)O(CH_2)_n$—O—$(CH_2)_m CH$=$CH_2$, wherein, in each formula, n represents an integer of 0 to 20, and m represents an integer 0 to 20;

o-,m-,p-divinylbenzene, o-,m-,p-$H_2C$=$CH$—$C_6H_4$—$CH_2CH$=$CH_2$,

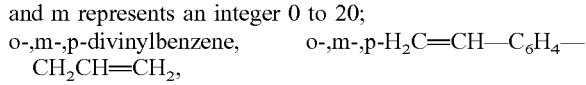

o-,m-,p-$H_2C$=$CH$—$C_6H_4$—$CH_2$—$C(CH_3)$=$CH_2$,
o-,m-,p-$H_2C$=$CH$—$C_6H_4$—$CH_2CH_2CH$=$CH_2$,
o-,m-,p-$H_2C$=$CH$—$C_6H_4$—$OCH_2CH$=$CH_2$,
o-,m-,p-$H_2C$=$CH$—$C_6H_4$—$OCH_2$—$C(CH_3)$=$CH_2$,
o-,m-,p-$H_2C$=$CH$—$C_6H_4$—$OCH_2CH_2CH$=$CH_2$,
o-,m-,p-$H_2C$=$C(CH_3)$—$C_6H_4$—$C(CH_3)$=$CH_2$,
o-,m-,p-$H_2C$=$C(CH_3)$—$C_6H_4$—$CH_2CH$=$CH_2$,
o-,m-,p-$H_2C$=$C(CH_3)$—$C_6H_4$—$CH_2C(CH_3)$=$CH_2$,
o-,m-,p-$H_2C$=$C(CH_3)$—$C_6H_4$—$CH_2CH_2CH$=$CH_2$,
o-,m-,p-$H_2C$=$C(CH_3)$—$C_6H_4$—$OCH_2CH$=$CH_2$,
o-,m-,p-$H_2C$=$C(CH_3)$—$C_6H_4$—$OCH_2$—$C(CH_3)$=$CH_2$,
o-,m-,p-$H_2C$=$C(CH_3)$—$C_6H_4$—$OCH_2CH_2CH$=$CH_2$, in the above formulas, $C_6H_4$ denotes a phenylene group.

The time for subjecting said compound having a polymerizable alkenyl group and an alkenyl group low in polymerizability combinedly is not particularly restricted but it is preferred that the second monomer be subjected to reaction at the terminal stage of polymerization reaction or after completion of the polymerization of the predetermined monomer.

[A-b] Method comprising subjecting a compound having at least two alkenyl groups low in polymerizability as the second monomer to reaction at the terminal stage of polymerization reaction or after completion of the reaction of the predetermined monomer in vinyl polymer synthesis by living radical polymerization.

As such compound, which is not particularly restricted, there may be mentioned compounds represented by the general formula 10:

$$H_2C=C(R^1)-R^{18}-C(R^1)=CH_2 \qquad (10)$$

wherein $R^1$ is as defined above and the two of them groups may be the same or different and $R^{18}$ represents a divalent organic be the same or different and $R^{18}$ represents a divalent organic group having 1 to 20 carbon atoms which may optionally contain one or more ether bonds.

The compound of the above general formula 10 is not particularly restricted but is preferably a 1,5-hexadiene, 1,7-octadiene or 1,9-decadiene for reasons of ready availability.

As regards the above method [A] for synthesizing a vinyl polymer having at least one alkenyl group by introducing the alkenyl group directly into the polymer main chain, the method [A-b] is preferred since it is more easy to control the number of alkenyl groups to be introduced per polymer molecule.

In the above method [B] for synthesizing a vinyl polymer having a terminal halogen, the atom transfer radical polymerization method is preferably used. The method of substituting the halogen in said polymer to an alkenyl-containing functional group is not particularly restricted but includes, among others, the techniques [B-a] to [B-d] specifically mentioned below.

[B-a] Method comprising substituting the halogen by reacting a terminal halogen-containing vinyl polymer with one of various alkenyl-containing organometallic compounds.

As such organometallic compounds, there may be mentioned organolithium, organosodium, organopotassium, organomagnesium, organotin, organosilicon, organozinc and organocopper compounds, among others. In particular, organotin and organocopper compounds are preferred, since they react selectively with the halogen at the growing terminus in atom transfer radical polymerization but are low in reactivity with the carbonyl group.

Preferred as the alkenyl-containing organotin compound, which is not particularly restricted, are compounds represented by the general formula 11:

$$H_2C=C(R^1)C(R^{19})(R^{20})Sn(R^{21}) \qquad (11)$$

(wherein $R^1$ is as defined above, $R^{19}$ and $R^{20}$ may be the same or different and each represents a hydrogen atom or an alkyl group having 1 to 10 carbon atoms, an aryl group having 6 to 10 carbon atoms or an aralkyl group having 7 to 10 carbon atoms and $R^{21}$ represents an alkyl group having 1 to 10 carbon atoms, an aryl group or an aralkyl group).

Specific examples of the organotin compound of the general formula 11 are allyltributyltin, allyltrimethyltin, allyltri(n-octyl)tin, allyltri(cyclohexyl)tin and the like. As the alkenyl-containing organocopper compound, there may be mentioned divinylcopper lithium, diallylcopper lithium, diisopropenylcopper lithium and the like.

[B-b] Method comprising reacting a halogen-terminated vinyl polymer with an alkenyl-containing stabilized carbanion represented by the general formula 12, for instance:

$$M^+C^-(R^{23})(R^{24})-R^{22}-C(R^1)=CH_2 \qquad (12)$$

(wherein $R^1$ is as defined above, $R^{22}$ represents a divalent organic group having 1 to 20 carbon atoms, which may optionally containing one or more ether groups, $R^{23}$ and $R^{24}$ each is an electron-withdrawing group contributing to stabilize the carbanion $C^-$ or one of them is said electron-withdrawing group and the other is a hydrogen atom or an alkyl group having 1 to 10 carbon atoms or a phenyl group. As the electron-withdrawing group represented by $R^{23}$ and $R^{24}{}_1$ there may be mentioned $-CO_2R$ (ester group), $-C(O)R$ (keto group), $-CON(R)_2$ (amide group), $-COSR$ (thioester group), $-CN$ (nitrile group) and $-NO_2$ (nitro group), among others. The substituent R is an alkyl group having 1 to 20 carbon atoms, an aryl group having 6 to 20 carbon atoms or an aralkyl group having 7 to 20 carbon atoms, preferably an alkyl group having 1 to 10 carbon atoms or a phenyl group. Particularly preferred as $R^{23}$ and $R^{24}$ are $-CO_2R$, $-C(O)R$ and $-CN$. $M^+$ represents an alkali metal ion or a quaternary ammonium ion).

As the alkali metal ion, there may specifically be mentioned lithium ion, sodium ion and potassium ion and, as the quaternary ammonium ion, there may specifically be mentioned tetramethylammonium ion, tetraethylammonium ion, trimethylbenzylammonium ion, trimethyldodecylammonium ion and tetrabutylammonium ion, among others.

The carbanion of the above general formula 12 can be obtained by reacting a precursor thereof with a basic compound and thereby withdrawing an active carbon.

As example of the compound to serve as the precursor of the carbanion of the general formula 12, there may be mentioned the following:

$H_2C=CH-CH(CO_2CH_3)_2$, $H_2C=CH-CH(CO_2C_2H_5)_2$,
$H_2C=CH-(CH_2)_nCH(CO_2CH_3)_2$, $H_2C=CH-(CH_2)_nCH(CO_2C_2H_5)_2$,
o-,m-,p-$H_2C=CH-C_6H_4-CH(CO_2CH_3)_2$,
o-,m-,p-$H_2C=CH-C_6H_4-CH(CO_2C_2H_5)_2$,
o-,m-,p-$H_2C=CH-C_6H_4-CH_2CH(CO_2CH_3)_2$,
o-,m-,p-$H_2C=CH-C_6H_4-CH_2CH(CO_2C_2H_5)_2$,
$H_2C=CH-CH(C(O)CH_3)(CO_2C_2H_5)$, $H_2C=CH-(CH_2)_nCH(C(O)CH_3)(CO_2C_2H_5)$,
o-,m-,p-$H_2C=CH-C_6H_4-CH(C(O)CH_3)(CO_2C_2H_5)$,
o-,m-,p-$H_2C=CH-C_6H_4-CH_2CH(C(O)CH_3)(CO_2C_2H_5)$,
$H_2C=CH-CH(C(O)CH_3)_2$, $H_2C=CH-(CH_2)_nCH(C(O)CH_3)_2$,
o-,m-,p-$H_2C=CH-C_6H_4-CH(C(O)CH_3)_2$,
o-,m-,p-$H_2C=CH-C_6H_4-CH_2CH(C(O)CH_3)_2$,
$H_2C=CH-CH(CN)(CO_2C_2H_5)$, $H_2C=CH-(CH_2)_nCH(CN)(CO_2C_2H_5)$,
o-,m-,p-$H_2C=CH-C_6H_4-CH(CN)(CO_2C_2H_5)$,
o-,m-,p-$H_2C=CH-C_6H_4-CH_2CH(CN)(CO_2C_2H_5)$,
$H_2C=CH-CH(CN)_2$,
$H_2C=CH-(CH_2)_nCH(CN)_2$, o-,m-,p-$H_2C=CH-C_6H_4-CH(CN)_2$,
o-,m-,p-$H_2C=CH-C_6H_4-CH_2CH(CN)_2$, $H_2C=CH-(CH_2)_nNO_2$,
o-,m-,p-$H_2C=CH-C_6H_4-CH_2NO_2$, o-,m-,p-$H_2C=CH-C_6H_4-CH_2CH_2NO_2$,

H₂C=CH—CH(C₆H₅)(CO₂C₂H₅), H₂C=CH—(CH₂)ₙCH(C₆H₅)(CO₂C₂H₅),
o-,m-,p-H₂C=CH—C₆H₄—CH(C₆H₅)(CO₂C₂H₅),
o-,m-,p-H₂C=CH—C₆H₄—CH₂CH(C₆H₅)(CO₂C₂H₅), in the above formulas, n represents an integer of 1 to 10.

For preparing the carbanion of the general formula 12 by withdrawing proton from the above compound, various basic compounds can be used. As examples of such basic compounds, there may be mentioned the following compounds:

Alkali metals such as sodium, potassium and lithium; metal alkoxides such as sodium methoxide, potassium methoxide, lithium methoxide, sodium ethoxide, potassium ethoxide, lithium ethoxide, sodium tert-butoxide and potassium tert-butoxide; carbonates such as sodium carbonate, potassium carbonate, lithium carbonate and sodium hydrogencarbonate; hydroxides such as sodium hydroxide and potassium hydroxide; hydrides such as sodium hydride, potassium hydride, methyllithium and ethyllithium; organometals such as n-butyllithium, tert-butyllithium, lithium diisopropylamide and lithium hexamethyldisilazide; alkylamines such as trimethylamine, triethylamine and tributylamine; polyamines such as tetramethylethylenediamine and pentamethyldiethylenetriamine; pyridine compounds such as pyridine and picoline; and so forth.

The basic compound is used in an equivalent amount or in slight excess, preferably 1 to 1.2 equivalent, relative to the precursor substance.

A quaternary ammonium salt can also be used as said carbanion. In that case, it can be obtained by preparing a carboxylic acid alkali metal salt and reacting this with a quaternary ammonium halide. Examples of the quaternary ammonium halide are tetramethylammonium halides, tetraethylammonium halides, trimethylbenzylammonium halides, trimethyldodecylammonium halides and tetrabutylammonium halides, among others.

As the solvent to be used in reacting the above precursor compound with the basic compound, there may be mentioned, among others, hydrocarbon solvents such as benzene and toluene; ether solvents such as diethyl ether, tetrahydrofuran, diphenyl ether, anisole and dimethoxybenzene; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and t-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide and dimethylacetamide; and sulfoxide solvents such as dimethyl sulfoxide. These may be used singly or two or more of them may be used in admixture.

The carbanion represented by the general formula 12 as prepared by reacting the above precursor with the basic compound is reacted with a halogen-terminated vinyl polymer, whereby an alkenyl-terminated vinyl polymer can be obtained.

[B-c] Method comprising reacting a halogen-terminated vinyl polymer with an elementary metal or an organometallic compound to convert the former to an enolate anion, followed by reaction with an alkenyl-containing electrophilic compound.

Particularly preferred as the elementary metal is zinc, since it hardly causes such a side reaction as the attack of the resulting enolate anion against other ester groups or the transition thereof. Usable as the alkenyl-contianing electrophilic compound are various ones such as, for example, alkenyl-containing compounds having a leaving group such as a halogen atom or an acetyl group, alkenyl-containing carbonyl compounds, alkenyl-containing isocyanate compounds and alkenyl-containing acid halides. Among these, alkenyl-containing compounds having a leaving group such as a halogen atom or an acetyl group are preferred since the use thereof does not allow introduction of atoms other than a carbon atom into the main chain, hence the weathering resistance of the vinyl polymer is not lost.

[B-d] Method comprising reacting a halogen-terminated vinyl polymer with an alkenyl-containing oxy anion represented by the general formula 13 shown below or an alkenyl-containing carboxylate anion represented by the general formula 14 given below, to thereby cause substitution of the alkenyl-containing substituent for the halogen atom:

$$CH_2=C(R^1)—R^{22}—O^-M^+ \quad (13)$$

(wherein $R^1$, $R^{22}$ and $M^+$ are as defined above);

$$CH_2=C(R^1)—R^{22}—C(O)O^-M^+ \quad (14)$$

(wherein $R^1$, $R^{22}$ and $M^+$ are as defined above).

As the precursor compounds of the oxy anions represented by the general formulas 13 and 14, there may be mentioned the following compounds, among others: alcoholic hydroxyl-containing compounds such as H₂C=CH—CH₂—OH, H₂C=CH—CH(CH₃)—OH, H₂C=C(CH₃)—CH₂—OH, H₂C=CH—(CH₂)ₙ—OH (n represents an integer 2 to 20), H₂C=CH—CH₂—O—(CH₂)₂—OH, H₂C=CH—C(O)O—(CH₂)₂—OH, H₂C=C(CH₃)—C(O)O—(CH₂)₂—OH, o-,m-,p-H₂C=CH—C₆H₄—CH₂—OH, o-,m-,p-H₂C=CH—CH₂—C₆H₄—CH₂—OH, o-,m-,p-H₂C=CH—CH₂—O—C₆H₄—CH₂—OH and the like;

phenolic hydroxyl-containing compounds such as o-,m-,p-H₂C=CH—C₆H₄—OH, o-,m-,p-H₂C=CH—CH₂—C₆H₄—OH, o-,m-,p-H₂C=CH—CH₂—O—C₆H₄—OH and the like;

carboxyl-containing compounds such as H₂C=CH—C(O)—OH, H₂C=C(CH₃)—C(O)—OH, H₂C=CH—CH₂—C(O)—OH, H₂C=CH—(CH₂)ₙ—C(O)—OH (n represents an integer 2 to 20), H₂C=CH—(CH₂)ₙ—OC(O)—(CH₂)ₘ—C(O)—OH (m and n are the same or different, each represents an integer of 0 to 19), o-,m-,p-H₂C=CH—C₆H₄—C(O)—OH, o-,m-,p-H₂C=CH—CH₂—C₆H₄—C(O)—OH, o-,m-,p-H₂C=CH—CH₂—O—C₆H₄—C(O)—OH, o-,m-,p-H₂C=CH—(CH₂)ₙ—OC(O)—C₆H₄—C(O)—OH (n represents an integer 0 to 13) and the like.

Various basic compounds are used to withdraw a proton from the above compounds and convert it to an anion of the above general formula 13 or 14. Those basic compounds specifically mentioned hereinabove as useful in preparing the carbanion of the general formula 12 are all usable as the above basic compounds. As regards the reaction solvent, all those specifically mentioned hereinabove in relation to carbanion preparation are suited for use.

Among the above synthesis methods [B], the method [B-d] is preferred for alkenyl group introduction by converting the halogen in a halogen-terminated vinyl polymer obtained by atom transfer radical polymerization using an organic halide or halogenated sulfonyl compound or the like as an initiator and a transition metal complex as a catalyst to an alkenyl group, since the alkenyl group introduction can be realized with a high proportion. Among the variations of method [B-d], the one comprising subjecting an alkenyl-containing carboxylate anion represented by the general formula 14 to reaction is more preferred.

When, in the method of producing a vinyl monomer which comprises the atom transfer radical polymerization method using an organic halide or halogenated sulfonyl compound or the like as an initiator and a transition metal complex as a catalyst, the alkenyl-containing organic halide is used as an initiator, a vinyl polymer having a structure such that the alkenyl group occurs at one terminal and the initiator group for atom transfer radical polymerization at the other terminus can be obtained. When the halogen atom at the termination terminus of the polymer thus obtained is converted to an alkenyl-containing substituent, a vinyl polymer having an alkenyl group at both ends can be obtained. Usable as the method for said conversion is the method already described hereinabove.

Detailed mention of the alkenyl-containing organic halide will be made later herein in relation to the explanation of atom transfer radical polymerization.

The method of substituting an alkenyl-containing functional group for the hydroxyl group of a hydroxyl-terminated vinyl polymer according to the synthesis method [C] mentioned above is not particularly restricted but there may be mentioned those specific methods [C-a] to [C-d] which are to be mentioned below.

The above hydroxyl-terminated vinyl polymer can be obtained by the methods [D-a] to [D-f] to be mentioned later herein.

[C-a] Method comprising reacting the hydroxyl group of a hydroxyl-terminated vinyl polymer with a base such as sodium hydroxide or sodium methoxide and then reacting the resulting product with an alkenyl-containing halide such as allyl chloride.

[C-b] Method comprising reacting a hydroxyl-terminated vinyl polymer with an alkenyl-containing isocyanate compound such as allyl isocyanate.

[C-c] Method comprising reacting a hydroxyl-terminated vinyl polymer with an alkenyl-containing acid halide, such as (meth)acryloyl chloride, in the presence of a base such as pyridine.

[C-d] Method comprising reacting a hydroxyl-terminated vinyl polymer with an alkenyl-containing carboxylic acid, such as acrylic acid, in the presence of an acid catalyst.

The method of producing the hydroxyl-terminated vinyl polymer to be used for the above method [C] includes, but is not limited to, such methods as mentioned below under [D-a] to [D-f].

[D-a] Method comprising subjecting a compound having both a polymerizable alkenyl group and a hydroxyl group in one and the same molecule as represented by the general formula 15 shown below to reaction as a second monomer on the occasion of synthesizing a vinyl polymer by living radical polymerization:

(wherein $R^1$, $R^{16}$ and $R^{17}$ are as defined above.)

The time for subjecting the compound having both a polymerizable alkenyl group and a hydroxyl group in one and the same molecule to reaction is not restricted but, particularly when rubber-like properties are expected, said compound is preferably subjected to reaction as a second monomer at the terminal stage of the polymerization reaction or after completion of the reaction of a predetermined monomer.

[D-b] Method comprising subjecting a compound having an alkenyl group low in polymerizability and a hydroxyl group in one and the same molecule to reaction as a second monomer on the occasion of synthesizing a vinyl polymer by living radical polymerization at the terminal stage of the polymerization reaction or after completion of the reaction of a predetermined monomer.

Such compound is not particularly restricted but includes, for example, compounds represented by the general formula 16:

(wherein $R^1$ and $R^{18}$ are as defined above.)

Said compounds of the general formula 16 are not particularly restricted but, from the viewpoint of ready availability, such alkenyl alcohols as 10-undecenol, 5-hexenol and allyl alcohol are preferred.

[D-c] Method comprising hydrolyzing the halogen atom of a vinyl polymer having a terminal carbon-halogen bond as obtained by atom transfer radical polymerization, as disclosed in Japanese Kokai Publication Hei-04-132706, or reacting said halogen atom with a hydroxyl-containing compound to thereby introduce a hydroxyl group terminally.

[D-d] Method comprising reacting a vinyl polymer having a terminal carbon-halogen bond as obtained by atom transfer radical polymerization with a hydroxyl-containing stabilized carbanion represented by the general formula 17:

(wherein $R^{22}$, $R^{23}$ and $R^{24}$ are as defined above), to thereby effect substitution for the halogen.

[D-e] Method comprising reacting a vinyl polymer having a terminal carbon-halogen bond as obtained by atom transfer radical polymerization with an elementary metal, such as zinc, or an organometallic compound and then reacting the resulting enolate anion with an aldehyde or ketone.

[D-f] Method comprising reacting a halogen-terminated vinyl polymer with a hydroxyl-containing oxy anion represented by the general formula 18 given below or a hydroxyl-containing carboxylate anion represented by the general formula 19 shown below to thereby substitute the corresponding hydroxyl-containing substituent for the halogen:

(wherein $R^{22}$ and $M^+$ are as defined above);

(wherein $R^{22}$ and $M^+$ are as defined above).

In cases where, in the practice of the present invention, the hydroxyl introduction is free of direct halogen involvement, such as in [D-a] and [D-b], the method [D-b] is more preferred since the control is easier.

In cases where the hydroxyl group introduction is effected by converting the halogen atom of a vinyl polymer having at least one carbon-halogen bond, such as in [D-c] to [D-f], the method [D-f] is more preferred since the control is easier.

<Introduction of an Initiator Group for Atom Transfer Radical Polymerization>

The initiator group for atom transfer radical polymerization has the structure of the initiator mentioned in detail hereinabove in the description of atom transfer radical polymerization and is preferably a group represented by the general formula 2 or 3, a benzyl halide group or a sulfonyl halide group, for instance:

(2)

(wherein Ar is an aryl group, which may optionally have a substituent, $R^2$ is a hydrogen atom or a hydrocarbon group having 1 to 20 carbon atoms and X is chlorine, bromine or iodine);

(3)

(wherein Ar is an aryl group, which may optionally have a substituent, $R^2$ is a hydrogen atom or a methyl group, R is an organic group having 1 to 20 carbon atoms and X is chlorine, bromine or iodine).

When the polymer (I) is produced by atom transfer radical polymerization, the terminus thereof is an initiator group for atom transfer radical polymerization. The group represented by the general formula 2 or 3 is preferably obtained as a growing terminus when a styrenic or acrylic monomer is polymerized by atom transfer radical polymerization. When this initiator group is subjected to conversion for alkenyl group introduction, as mentioned hereinabove, there can be mentioned the method comprising producing a polymer having a growth terminus at both ends by using a bifunctional initiator, for instance, and converting only one terminus to an alkenyl group.

As another method, there may be mentioned the method of introducing a compound having an initiator group for atom transfer radical polymerization and an alkenyl group, or a compound having an initiator group for atom transfer radical polymerization and a hydrosilyl group into various hydrosilyl- or alkenyl-containing polymers by hydrosilylation (refer to Polymer, 39 (21), 5163 (1998)).

Although the method of producing the above-mentioned polymer (I) is not particularly restricted, a preferred method comprises conducting atom transfer radical polymerization using a functional group-containing initiator and using the product as it is when the functional group is an alkenyl group and, when the functional group is other than an alkenyl group, converting said group to an alkenyl group. As an example, the method described in Polymer J., 30, 138 (1998) may be mentioned.

More specifically, the use of an allyl halide is preferred.

It is also possible to use the group represented by the general formula 2 as an initiator group for living cationic polymerization, and the polymer produced by the above-mentioned production method may be utilized for producing a multiblock copolymer by adding the polymer (I) having an initiator group for living cationic polymerization to a living cationic polymerization system.

<Production of Polymer (I) by Living Cationic Polymerization>

The production of the polymer (I) by living cationic polymerization is mentioned below.

The living cationic polymerization itself has already been described hereinabove under the section "living cationic polymerization". Therefore, the method of alkenyl group introduction and the method of introducing an initiator group for living cationic introduction are described here.

The polymer (I) to be produced by living cationic polymerization is preferably selected from the group consisting of styrene polymers, isobutylene polymers, polyether polymers and vinyl ether polymers.

<Terminal Functional Group Introduction>

The method of introducing an alkenyl group into the polymer produced by living cationic polymerization is not particularly restricted but includes the following, for instance:

① Method Using an Allylsilane

As disclosed in Japanese Kokai Publication Sho-63-105005, the polymer obtained by the Inifer method for living cationic polymerization is reacted, immediately after polymerization or after formation, with allyltrimethylsilane to give an allyl-terminated polymer.

② Method Using an Unconjugated Diene

As disclosed in Japanese Kokai Publication Hei-04-288309, an unconjugated diene, such as 1,7-octadiene, is added to an Inifer method living cationic polymerization system to give an allyl-terminated polymer.

③ Method Using an Organometallic Reagent

As disclosed in Japanese Kokai Publication Hei-04-311705, the chlorine atom terminus of a polyisobutylene polymer is alkylated with a Grignard reagent or an alkyl-lithium. The use of an alkenyl-containing Grignard reagent results in introduction of the alkenyl group.

④ Method Comprising Hydroxyl Group Conversion

The hydroxyl group at a terminus, in the main chain or in a side chain is converted to —ONa or —OK, for instance, followed by reaction with an organic halide represented by the general formula 20:

(20)

[wherein X is a halogen atom such as a chlorine or iodine atom and $R^{25}$ is a divalent organic group represented by $-R^{26}-$, $-R^{26}-OC(=O)-$ or $-R^{26}-C(=O)-$ (in which $R^{26}$ is a divalent hydrocarbon group having 1 to 20 carbon atoms, preferably an alkylene, cycloalkylene, arylene or aralkylene group), more preferably a divalent group selected from the group consisting of $-CH_2-$ and

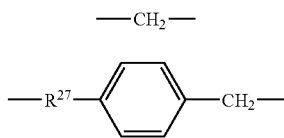

(in which $R^{27}$ is a hydrocarbon group having 1to 10carbon atoms)], whereby an alkenyl-terminated saturated hydrocarbon polymer is produced.

As the method of converting the terminal hydroxyl group of a hydroxyl-terminated saturated hydrocarbon polymer to an oxymetal group, there may be mentioned the method comprising reacting said polymer with an alkali metal such as Na or K; a metal hydride such as NaH; a metal alkoxide such as $NaOCH_3$; a caustic alkali such as caustic soda or caustic potash or the like.

The above method gives an alkenyl-terminated saturated hydrocarbon polymer having almost the same molecular weight as that of the hydroxyl-terminated saturated hydrocarbon polymer used as starting material. When a polymer with a higher molecular weight is desired, the starting material is reacted with a polyvalent organic halide containing two or more halogen atoms per molecule, for example methylene chloride, bis(chloromethyl) benzene or bis (chloromethyl) ether, prior to the reaction with an organic halide of the general formula 20, whereby the molecular weight can be increased. The subsequent reaction with the organic halide of the general formula 20 can give an alkenyl-terminated hydrogenated polybutadiene polymer with a higher molecular weight.

Specific examples of the organic halide represented by the general formula 20 are, but are not limited to, allyl chloride, allyl bromide, vinyl(chloromethyl)benzene, allyl(chloromethyl)benzene, allyl(bromomethyl)benzene, allyl chloromethyl ether, allyl(chloromethoxy)benzene, 1-hexenyl(chloromethoxy)benzene and allyloxy(chloro-methyl)benzene. Among these, allyl chloride is preferred in view of its inexpensiveness and ready reactivity.

⑤ Method Utilizing the Friedel-Crafts Reaction

Alkenyl group introduction is realized by subjecting one of various alkenyl phenyl ethers and a Cl group to Friedel-Crafts reaction. And, after hydroxyl group introduction by subjecting one of various phenols and a Cl group to Friedel-Crafts reaction the above-mentioned method for alkenyl group introduction is combinedly applied.

⑥ Method Comprising an Elimination Reaction

As disclosed in U.S. Pat. No. 4,316,973, a halogen-terminated polyisobutylene polymer synthesized by the Inifer method for living cationic polymerization is subjected to hydrogen halide elimination, to thereby effect terminal alkenyl group introduction.

⑦ Method Utilizing an Alkenyl-Containing Initiator

As disclosed in J. Polym. Sci., Part A: Polym. Chem., 2699 (1994).

⑧ Method Utilizing a Silyl Enol Ether

As disclosed in J. Polym. Sci., Part A: Polym. Chem., 2531 (1994), trimethylsilyl methacrylate is reacted with the living cationic polymerization terminus to effect introduction of a methacryloyl group.

Among these methods, ① and ② are preferred, though not essentially requisite.

<Introduction of an Initiator Group for Living Cationic Polymerization>

The initiator group for living cationic polymerization has the structure of the initiator mentioned in detail hereinabove in the description of living cationic polymerization and is preferably, but is not limited to, a group represented by the general formula 2, among others:

—CH$_2$—C(Ar)(R$^2$)(X)   (2)

(wherein Ar is an aryl group, which may optionally have a substituent, R$^2$ is a hydrogen atom or a hydrocarbon group having 1 to 10 carbon atoms and X is chlorine, bromine or iodine).

The method of introducing this initiator group for living cationic polymerization is not particularly restricted but mention may be made of the utilization of the terminus of the polymer produced by living cationic polymerization, the method comprising the above-mentioned atom transfer radical polymerization, and the method comprising converting a functional group of a polymer by such a reaction as hydrosilylation, for initiator group introduction, among others.

Structure of the Block Copolymer

The structure of the block copolymer of the present invention is not particularly restricted but includes those copolymers classifiable on the basis of polymer (I) and of the system to which the polymer (I) is added, namely living radical polymerization or living cationic polymerization (hereinafter referred to as "living C/R polymerization" for short), as follows:

① living C/R polymerization using a polymer (I) having one alkenyl group per molecule and a unifunctional initiator; ② living C/R polymerization using a polymer (I) having one alkenyl group per molecule and a bifunctional initiator; ③ living C/R polymerization using a polymer (I) having one alkenyl group per molecule and a polyfunctional initiator; ④ living C/R polymerization using a polymer (I) having two alkenyl groups per molecule and a unifunctional initiator; ⑤ living C/R polymerization using a polymer (I) having more than two alkenyl groups per molecule and a unifunctional initiator; ⑥ living C/R polymerization using a polymer (I) having two alkenyl groups per molecule and a bifunctional initiator; ⑦ the case in which either of the number of alkenyl groups in polymer (I) and the number of initiation sites of the initiator in living C/R polymerization is not less than 2 and the other is not less than 3; and so forth.

In the case of ①, an AB type block copolymer is obtained; in the case of ② or ④, an ABA type block copolymer is obtained; in the case of ③ or ⑤, a stellar block copolymer is obtained; in the case of ⑥, a multiblock copolymer is obtained; and in the case of ⑦, a crosslinked block copolymer is obtained.

A multiblock copolymer can also be obtained when a polymer (I) having an initiator group for living radical polymerization or living cationic polymerization is used.

For each polymer block, various species can be synthesized. It is preferred, though not requisite, that, in the polymer produced according to the present invention, the polymer (I) have a glass transition point of not lower than 25° C. and the polymer chain newly produced by living C/R polymerization upon addition of the polymer (I) have a glass transition point of not higher than 25° C. or that the polymer (I) have a glass transition point of not higher than 25° C. and the polymer chain newly produced by living C/R polymerization upon addition of the polymer (I) have a glass transition point of not lower than 25° C. In an ABA type block copolymer, for instance, when A is a polymer having a higher glass transition point (not specifically restricted but, for example, not lower than 25° C.) and B is a polymer having a lower glass transition point (not specifically restricted but, for example, not higher than 25° C.), properties as a thermoplastic elastomer can be expected. In the case of stellar polymers as well, properties as a thermoplastic elastomer can be expected when a polymer block having a higher glass transition point is used as the exterior block and a polymer block having a lower glass transition point as the inside block.

Uses

<Thermoplastic Elastomer>

The block copolymer of the present invention can be used in substantially the same fields of application as the existing thermoplastic elastomers. More specifically, it can be used for modifying resins or asphalt, for preparing compounds of the block copolymer with resins (with a plasticizer, a filler, a stabilizer, etc. added as occasion demands), as an anti-shrink agent for thermosetting resins, or as a base polymer for adhesives or pressure-sensitive adhesives or for damping materials. As specific fields of application, there may be mentioned automotive upholstery and exterior, electric and electronic fields, food wrapping films and tubes, drug containers or containers for medical use, sealable articles and the like.

<Impact Resistance Improving Agent>

While the block copolymer of the present invention by itself can serve as a molding material as a resin having impact resistance, it can serve as an impact resistance improving agent as well for providing various thermoplastic resins and thermosetting resins with a high level of impact resistance when admixed with said resins. Further, it can also be used as a processability improving agent, compatibilizing agent, flatting agent, heat resistance modifier or the like.

The thermoplastic resins which can be improved in shock resistance by addition of the block copolymer of the present invention include, but are not limited to, polymethyl methacrylate resins, polyvinyl chloride resins, polyethylene resins, polypropylene resins, cyclic olefin copolymer resins, polycarbonate resins, polyester resins, polycarbonate resin-polyester resin blends, homopolymers and copolymers obtained by polymerizing 70 to 100% by weight of at least one vinyl monomer selected from the group consisting of aromatic alkenyl compounds, vinyl cyanide compounds and (meth)acrylic acid esters and 0 to 30% by weight of another vinyl monomer copolymerizable therewith, such as ethylene, propylene or vinyl acetate and/or a copolymerizable conjugated diene monomer, such as butadiene or isoprene, polystyrene resins, polyphenylene ether resins, polystyrene-polyphenylene ether resin blends and the like. Said block copolymer can be used in a wide variety of thermoplastic resins. In particular, polymethyl methacrylate resins, polyvinyl chloride resins, polypropylene resins, cyclic polyolefin resins, polycarbonate resins and polyester resins, among others, are preferred since they can readily show its characteristics such as improved weathering resistance and impact resistance.

As the method of adding the block copolymer of the present invention to various resins, there may be mentioned the method comprising mechanically mixing and shaping into pellets using a conventional apparatus such as a Banbury mixer, roll mill or twin-screw extruder. The pellets shaped by extrusion can be molded in a wide temperature range and, for molding, an ordinary injection molding machine, blow molding machine or extrusion molding machine, for instance, is used.

Furthermore, in the resulting resin compositions, there may be incorporated one or more additives as necessary, including impact resistance improving agents, stabilizers, plasticizers, lubricants, flame retardants, pigments, fillers and the like. More specifically, there may be mentioned impact resistance improving agents such as methyl methacrylate-butadiene-styrene copolymers (MBS resins), acrylic graft copolymers and acrylic-silicone composite rubber type graft copolymers; stabilizers such as triphenyl phosphate; lubricants such as polyethylene wax and polypropylene wax; fire retardants such as phosphate fire retardants, e.g. triphenyl phosphate, tricresyl phosphate, bromine-containing fire retardants, e.g. decabromobiphenyl, decabromodiphenyl ether, and antimony trioxide; pigments such as titanium oxide, zinc sulfide and zinc oxide; and filler such as glass fiber, asbestos, wollastonite, mica, talc and calcium carbonate.

BEST MODES FOR CARRYING OUT THE INVENTION

In the following, specific examples of the present invention are described together with comparative examples. The following examples, however, are by no means limitative of the scope of the present invention.

In the examples and comparative examples, "part(s)" and "%" denote "part(s) by weight" and "% by weight", respectively.

In the following examples, the "number average molecular weight" and "molecular weight distribution (ratio of weight average molecular weight to number average molecular weight)" were determined by using gel permeation chromatography (GPC) using standard polystyrenes and expressed in terms of polystyrene equivalent. The GPC column used was a column packed with a crosslinked polystyrene gel and the solvent used for GPC was chloroform.

PRODUCTION EXAMPLE 1

A 500-mL three-necked flask equipped with a reflux condenser and a stirrer was charged with CuBr (3.44 g, 0.024 mol) and 2,2'-bipyridyl (11.2 g, 0.072 mol), the container was purged with nitrogen and, then, diphenyl ether (110 mL) and styrene (110 mL, 0.96 mol) were added. The contents were heated to 100° C., allyl bromide (2.08 mL, 0.024 mol) was added, and the mixture was heated at 100° C. for 7 hours with stirring.

The reaction mixture was diluted with 200 mL of toluene and the dilution was passed through an activated alumina column. The polymer was purified by repeated precipitation from methanol and then dried with heating under reduced pressure. The polymer had a number average molecular weight of 3360 with a molecular weight distribution of 1.23. It was confirmed by $^1$H NMR that the number of alkenyl groups at one end and the number of bromine groups at the other were identical.

PRODUCTION EXAMPLE 2

The procedure of Production Example 1 was followed in the same manner except that CuCl (2.38 g, 0.024 mol) was used in lieu of CuBr and allyl chloride (1.31 mL, 0.024 mol) in lieu of allyl bromide and that the reaction temperature was 130° C.

The polymer had a number average molecular weight of 5880 with a molecular weight distribution of 1.27. It was confirmed by $^1$H NMR that the number of alkenyl groups at one end and the number of chlorine groups at the other were identical.

PRODUCTION EXAMPLE 3

Treatment of the Terminal Halogen Group in the Polymer

A 100-mL three-necked flask equipped with a reflux condenser was charged with polymer [1] (10 g), potassium methylate (0.417 mg) and dimethylformamide (10 mL) and the mixture was heated at 70° C. with stirring under nitrogen for 1 hour.

The reaction mixture was evaporated, the residue was dissolved in toluene and the solution was filtered. The polymer [2] was purified by reprecipitation from methanol and drying with heating under reduced pressure.

Halogen group elimination was confirmed by $^1$H NMR analysis.

EXAMPLE 1

Synthesis of a Polystyrene-Polybutyl Acrylate Multiblock Copolymer

A 50-mL flask was charged with CuBr (0.10 g, 0.7 mmol) and the flask was purged with nitrogen. Acetonitrile (1.0 mL) was then added, and the contents were heated to 70° C. The polymer obtained in Production Example 1 (5.86 g), butyl acrylate (10 mL) and pentamethyldiethylenetriamine (0.04 mL, 0.17 mmol) were added, and the mixture was heated at 70° C. for 13 hours with stirring. The degree of conversion of butyl acrylate was 98%.

The reaction mixture was diluted with toluene and the solution was passed through an activated alumina column. The volatile matter was distilled off to give a polymer.

The polymer has a weight average molecular weight (Mw) of 46900 and GPC thereof gave a peak molecular weight (Mp) of 64500. The formation of a polystyrene-polybutyl acrylate multiblock copolymer was confirmed, The reaction scheme of this reaction is shown below.

volatile matter was then distilled off by heating under reduced pressure to give a pale yellow polymer. The polymer obtained, when analyzed by GPC (in terms of polystyrene equivalent), had a number average molecular weight of 16900 and a weight average molecular weight of 37400, hence a molecular weight distribution of 2.21. It was thus confirmed that a multiblock form had been formed. $^1$H NMR measurement also confirmed the formation of a multiblock form.

EXAMPLE 4

Synthesis of a Polystyrene-Polyisobutylene Block Polymer

Isobutylene was polymerized at −70° C. in a nitrogen atmosphere using methylene chloride/methylcyclohexane as a solvent, bis(1-chloro-1-methylethyl)benzene as an initiator, TiCl$_4$ as a catalyst and α-picoline as an electron donor. At the time point of addition of the catalyst, heat of polymerization was observed. At the time point of comple-

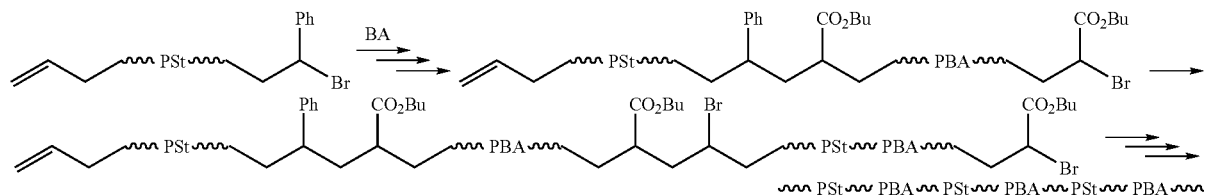

EXAMPLE 2

Synthesis of a Polystyrene-Polyisobutylene Multiblock Copolymer

Polymerization of isobutylene was carried out using, as an initiator, the polystyrene synthesized in Production Example 2 and having an allyl group at one terminus and a chloro group at the other. The polymerization was conducted at −70° C. using methylene chloride/methylcyclohexane as a solvent, TiCl$_4$ as a catalyst, and α-picoline as an electron donor. At the time point when the catalyst was added, heat of polymerization was observed, and the final conversion of isobutylene monomer was 80%. Upon $^1$H NMR measurement, no allyl group was observed, whereby the addition of the growing terminal cation could be confirmed.

EXAMPLE 3

Synthesis of a PBA-PEA Multiblock Form

A 30-mL glass reaction vessel was charged, in a nitrogen atmosphere, with cuprous bromide (50.0 mg, 0.348 mmol), acetonitrile (1.0 mL), butyl acrylate (10.0 mL, 69.8 mmol), diethyl 2,5-dibromoadipate (0.314 g, 0.871 mmol), an alkenyl-terminated PEA (9.85 g, 0.871 mmol, number average molecular weight 11300, molecular weight distribution 1.26, alkenyl group introduction percentage based on number average molecular weight 2.33) and pentamethyldiethylenetriamine (20 μL, 0.0958 mmol), and the mixture was stirred at 70° C. for 420 minutes, whereupon the consumption of butyl acrylate as determined by GC measurement was 98%. The mixture was treated with activated alumina and the tion of the polymerization of isobutylene, the polymer [2] and a mixed solution composed of α-picoline and methylene chloride/methylcyclohexane were added, and the reaction was further allowed to proceed.

While, at the time of addition of polymer [2], the number average molecular weight of polyisobutylene was 27,700, the addition of polymer [2] resulted in the formation of a high molecular weight polymer with a number average molecular weight of 31,000. With this high molecular weight polymer, UV absorption due to the aromatic ring was observed. Thus, a polyisobutylene-polystyrene copolymer was obtained.

PRODUCTION EXAMPLE 4

According to the method disclosed in Japanese Kokai Publication Sho-53-134095, an allyl type olefin-terminated polyoxypropylene was synthesized.

Thus, polyoxypropylene glycol with an average molecular weight of 3,000 and powdery caustic soda were stirred at 60° C., then bromochloromethane was added, and the reaction was allowed to proceed to increase the molecular weight. Then, allyl chloride was added, and terminal allyl etherification was carried out at 110° C. Terminally allyl-etherified polyoxypropylene in purified form was synthesized by treating the reaction product with aluminum silicate.

This polyether had a average molecular weight of 7,960 and, based on the iodine value, 92% of the termini were occupied by the olefinic group (0.0231 mol/100 g). The viscosity was 130 poises (40° C.) as measured using a type E viscometer.

PRODUCTION EXAMPLE 5

A one-liter four-necked flask equipped with stirrer, dropping funnel, thermometer, three-way cock and condenser was prepared and charged with 300 g of hydroxyl-terminated polytetramethylene oxide with an average molecular weight of about 2,000 (trademark: Terathane-2000; product of du Pont). After azeotropic degassing using toluene, a solution of 50.5 g of t-BuOK in 200 mL of THF was added. After 1 hour of stirring at 50° C., 49 mL of allyl chloride was added dropwise from the dropping funnel over 1 hour. After completion of the dropping, the reaction was allowed to proceed at 50° C. for about 1 hour. Then, 30 g of aluminum silicate was added at room temperature and the mixture was stirred for 30 minutes. Said mixture was filtered using diatomaceous earth as filtration aid, and the volatile components were removed using an evaporator, whereupon about 230 g of a transparent viscous liquid was obtained. This product was allowed to stand overnight at room temperature, whereupon it crystallized and became a white solid. Iodometry (0.0718 mol/100 g) revealed that the allyl group had been introduced into this polytetramethylene oxide at about 73% of the termini thereof.

PRODUCTION EXAMPLE 6

Toluene (50 mL) was added to 300 g of hydrogenated polyisoprene having a hydroxyl group at both termini (product of Idemitsu Petrochemical; trademark: Epol), and the mixture was dehydrated by azeotropic degassing. A solution of 48 g of t-BuOK in 200 mL of THF was injected into the mixture. After 1 hour of reaction at 50° C., 47 mL of allyl chloride was added dropwise over about 30 minutes. After completion of the dropping, the reaction was allowed to proceed at 50° C. for 1 hour. Thereafter, for the adsorption of the product salt, 30 g of aluminum silicate was added to the reaction mixture and the whole mixture was stirred at room temperature for 30 minutes. Purification by filtration gave about 250 g of allyl-terminated hydrogenated polyisoprene as a viscous liquid. 300 MHz 1H NMR analysis confirmed the allyl group introduction at 92% of the termini. The number of moles of the olefin as determined based on the iodine value was 0.1046 mol/100 g. The viscosity was 302 poises (23° C.) as measured using a type E viscometer.
* Typical physical values of Epol (from a technical data sheet)
Hydroxy content (meq/g): 0.90
Viscosity (poises/30° C.): 700
Average molecular weight (VPO measurement): 2,500.

PRODUCTION EXAMPLE 7

An acrylic ester monomer solution in toluene composed of 115.72 g of n-butyl acrylate, 60.00 g of methyl methacrylate, 20.16 g of allyl methacrylate, 6.46 g of n-dodecylmercaptan, 2.0 g of azobisisobutyronitrile and 400 mL of toluene was added dropwise from a dropping funnel over about 2 hours to a flask containing 50 mL of refluxing toluene in a nitrogen atmosphere. After completion of the dropping, the reaction was further allowed to proceed for 2 hours. The reaction mixture was evaporated and the residue was further dried at 80° C. under reduced pressure for 3 hours to give about 195 g of a pale-yellow viscous liquid oligomer. The number of moles of allyl group as determined by iodometry was 0.0818 mol/100 g and the molecular weight as measured by VPO was 2,950, and thus it was found that about 2.4 allyl groups, on average, had been introduced into molecule.

PRODUCTION EXAMPLE 8

A round-bottomed flask equipped with stirring rod, thermometer, dropping funnel, nitrogen inlet tube and condenser was charged with 300 g (0.1 mol) of hydroxyl-terminated polycaprolactone (number average molecular weight: 3,000, hydroxyl equivalent: 1,500), 24.0 g of pyridine and 300 mL of THF and then 32 g of allyl chloroformate was gradually added dropwise from the dropping funnel at room temperature. Thereafter, the mixture was heated to 50° C. and stirred for 3 hours. The salt formed was filtered off, 150 mL of toluene was added to the filtrate, the mixture was washed with 200 mL of aqueous hydrochloric acid, then neutralized and concentrated to give allyl-terminated polycaprolactone. The oligomer had a number average molecular weight of 3,200 as determined by VPO measurement. From the olefin portion of a 300 MHz $^1$H NMR spectrum, allyl group introduction could be confirmed. By olefin quantitation by iodometry, it was confirmed that about 1.83 allyl-type unsaturated groups (0.0573 mol/100 g), on average, had been introduced into each molecule.

PRODUCTION EXAMPLE 9

An autoclave was charged with a solution of 0.02 g of zinc hexacyanocobaltate-glyme complex and 1.0 g of dipropylene glycol in THF and 4.8 g of propylene oxide, and the reaction was allowed to proceed at 76° C. in a nitrogen atmosphere. Then, 72.6 g of propylene oxide was added to the reaction system. The unreacted monomer and solvent were recovered, and the residue was purified to give 75 g of an oil.

Upon GPC analysis, the product showed a single peak, and its hydroxyl value was 11.8 mg KOH/g. According to the procedure of Production Example 1, said product was reacted with NaOMe and then with allyl chloride to synthesize terminally allyl-etherified polyoxypropylene.

PRODUCTION EXAMPLE 10

A one-liter pressure glass autoclave was equipped with a stirring blade, a three-way cock and a vacuum line and, while evacuating through the vacuum line, the polymerization vessel was dried by heating at 100° C. for 1 hour. After cooling to room temperature, the three-way cock was opened to introduce nitrogen into the vessel to ordinary pressure.

Then, while feeding nitrogen through one route of the three-way cock, a mixed solvent (155 mL of methylene chloride and 348 mL of n-hexane) dried by molecular sieve treatment was introduced into the autoclave using a syringe. Then, a solution of 7.5 mmol of DCC (dicumyl chloride; compound A illustrated below) in 10 mL of methylene chloride was added, followed by addition of 3.0 mmol of the additive α-picoline.

Then, a pressure glass liquefied gas sampling tube equipped with a needle valve and containing 112.8 g of isobutylene dehydrated by passing through a column packed with barium oxide was connected with the three-way cock. The polymerization vessel proper was immersed in a dry ice-acetone bath at −70° C. and cooled for 1 hour while stirring the vessel inside. After this cooling, the inside pressure was reduced through the vacuum line and, then, the needle valve was opened to introduce isobutylene from the pressure glass liquefied gas sampling tube into the polymerization vessel. Thereafter, ordinary pressure was restored by feeding nitrogen through one route of the three-way cock, the cooling was further continued for 1 hour with stirring, and the polymerization vessel inside temperature was raised to −70° C.

Then, polymerization was initiated by adding 4.1 mL (37.5 mmol) of TiCl$_4$ through the three-way cock using a syringe to initiate the polymerization and, after the lapse of 1 hour, 27.7 mL (150 mmol) of 1,9-decadiene was added. After further 8 hours of reaction, the reaction mixture was poured into water to thereby deactivate the catalyst. Then, the organic layer was washed with three portions of pure water. After phase separation, the methylene chloride, n-hexane and 1,9-decadiene were distilled off under reduced pressure to give an allyl-terminated isobutylene polymer.

The structure of compound A is as shown below.

Compound A:

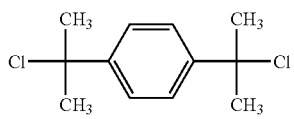

PRODUCTION EXAMPLE 11

A 3-liter pressure glass autoclave was equipped with a stirring blade, a three-way cock and a vacuum line and, while evacuating through the vacuum line, the polymerization vessel was dried by heating at 100° C. for 1 hour. After cooling to room temperature, the three-way cock was opened to introduce nitrogen into the vessel to ordinary pressure.

Then, while feeding nitrogen through one route of the three-way cock, a mixed solvent (618 mL of methylene chloride and 1,001 mL of n-hexane) dried by molecular sieve treatment was introduced into the autoclave using a syringe. Then, a solution of 15 mmol of DCC (dicumyl chloride) in 50 mL of methylene chloride was added, followed by addition of 6.0 mmol of the additive α-picoline.

Then, a pressure glass liquefied gas sampling tube equipped with a needle valve and containing 224 g of isobutylene dehydrated by passing through a column packed with barium oxide was connected with the three-way cock. The polymerization vessel proper was immersed in a dry ice-acetone bath at −70° C. and cooled for 1 hour while stirring the vessel inside. After this cooling, the inside pressure was reduced through the vacuum line and, then, the needle valve was opened to introduce isobutylene from the pressure glass liquefied gas sampling tube into the polymerization vessel. Thereafter, ordinary pressure was restored by feeding nitrogen through one route of the three-way cock, the cooling was further continued for 1 hour with stirring, and the polymerization vessel inside temperature was raised to −70° C.

Then, polymerization was initiated by adding 8.2 mL (75 mmol) of TiCl$_4$ through the three-way cock using a syringe and, after the lapse of 1 hour, 14.3 mL (90 mmol) of allyltrimethylsilane was added. After further 1 hour of reaction, the reaction mixture was poured into methanol to thereby terminate the reaction. The reaction mixture was stirred for a while and then allowed to stand to cause precipitation of the polymer.

The thus-obtained polymer was again dissolved in n-hexane, the solution was washed with three portions of pure water and the solvent was then distilled off to give an allyl-terminated isobutylene-based polymer.

For the polymers obtained in Production Examples 10 and 11, the percent yields were calculated based on the yields, the Mn and Mw/Mn values were determined by the GPC method, and the terminal structures were established by measuring, by the $^1$H-NMR method, and comparing the intensities of the resonance signals of protons ascribable to the respective structures (initiator-derived proton: 6.5 to 7.5 ppm and polymer terminal vinyl proton: 4.5 to 5.9 ppm). The results are shown in Table 1.

TABLE 1

| Production Example | Yield (%) | GPC Mn | Mw/Mn | NMR FN* |
|---|---|---|---|---|
| 10 | 96 | 18700 | 1.45 | 1.78 |
| 11 | 100 | 9100 | 1.29 | 1.96 |

Fn*: number of vinyl groups per molecule.

INDUSTRIAL APPLICABILITY

By adding, according to the present invention, various alkenyl-containing polymers to a polymerization system for living radical polymerization or living cationic polymerization, it is possible to obtain, with ease, block copolymers resulting from binding of these various polymers to one another. When a polymer having an initiator group for living radical polymerization or living cationic polymerization together with an alkenyl group is used, multiblock copolymers can be obtained with ease. Since the present invention utilizes living polymerization, block copolymers well controlled in structure can be obtained.

The invention claimed is:

1. A process for producing an AB block copolymer, an ABA block copolymer or a multiblock copolymer,
    which comprises adding an alkenyl-containing polymer (I) to a living radical polymerization system or a living cationic polymerization system,
    wherein said multiblock copolymer is obtained through the living radical polymerization or the living cationic polymerization using said polymer (I) having two alkenyl groups per molecule, and a bifunctional initiator.

2. The process according to claim 1, wherein the alkenyl group in said polymer (I) is represented by the general formula 1:

$$H_2C=C(R^1)— \quad (1)$$

wherein $R^1$ is a hydrogen atom or a hydrocarbon group containing 1 to 20 carbon atoms.

3. The process according to claim 2, wherein, in the general formula 1, $R^1$ is a hydrogen atom.

4. The process according to claim 1, wherein the alkenyl group in the polymer (I) is not activated by any of a carbonyl group, an alkenyl group and an aromatic ring each conjugated with the carbon-carbon double bond thereof.

5. The process according to claim 1 wherein the alkenyl group in said polymer (I) is located at a terminus of the polymer (I).

6. The process according to claim 1, wherein the polymerization system to which the polymer (I) is to be added is a living radical polymerization system.

7. The process according to claim 6, wherein the living radical polymerization system is an atom transfer radical polymerization system.

8. The process according to claim 7, wherein the polymer (I) has a group capable of serving as an initiator group for atom transfer radical polymerization, and the product block copolymer is a multiblock copolymer.

9. The process according to claim 8, wherein the group in polymer (I) which is capable of serving as an initiator group for atom transfer radical polymerization is represented by the general formula 2:

—C(Ar)(R²)(X)          (2)

wherein Ar is an aryl group, which may optionally have a substituent, $R^2$ is a hydrogen atom or a hydrocarbon group containing 1 to 20 carbon atoms and X is chlorine, bromine or iodine.

10. The process according to claim 8, wherein the group in polymer (I) which is capable of serving as an initiator group for atom transfer radical polymerization is represented by the general formula 3:

—C(CO₂R)(R²)(X)          (3)

wherein $R^2$ is a hydrogen atom or a methyl group, R is an organic group containing 1 to 20 carbon atoms and X is chlorine, bromine or iodine.

11. The process according to claim 7, wherein the metal complex to serve as a catalyst for atom transfer radical polymerization is a copper, nickel, ruthenium or iron complex.

12. The process according to claim 11, wherein the metal complex to serve as a catalyst for atom transfer radical polymerization is a copper complex.

13. The process according to claim 6, wherein the monomer to be polymerized in the living radical polymerization system is a (meth) acrylic monomer.

14. The process according to claim 1, wherein the polymerization system to which the polymer (I) is to be added is a living cationic polymerization system.

15. The process according to claim 14, wherein the polymer (I) has a group capable of serving as an initiator group for living cationic polymerization and the product block copolymer is a multiblock copolymer.

16. The process according to claim 15, wherein the group in polymer (I) which is capable of serving as an initiator group for living cationic polymerization is represented by the general formula 2:

—C(Ar)(R²)(X)          (2)

wherein Ar is an aryl group, which may optionally have a substituent, $R^2$ is a hydrogen atom or a hydrocarbon group containing 1 to 20 carbon atoms and X is chlorine, bromine or iodine.

17. The process according to claim 1, wherein the polymer (I) is produced by controlled radical polymerization.

18. The process according to claim 17, wherein the polymer (I) comprises a vinyl polymer produced by atom transfer radical polymerization.

19. The process according to claim 18, wherein the polymer (I) is produced by atom transfer radical polymerization using an alkenyl-containing initiator.

20. The process according to claim 19, wherein the polymer (I) is produced by using an allyl halide as an initiator.

21. The process according to claim 1, wherein the polymer (I) is produced by living cationic polymerization.

22. The process according to claim 21, wherein the polymer (I) produced by living cationic polymerization is selected from the group consisting of styrenic polymers, isobutylene polymers, polyether polymers and vinyl ether polymers.

23. The process according to claim 1, wherein the polymer (I) is a vinyl polymer.

24. The process according to claim 1, wherein the polymer (I) is a polyolefin polymer.

25. The process according to claim 1, wherein the polymer (I) is a hydrocarbon polymer.

26. The process according to claim 1, wherein the polymer (I) is a polyester polymer.

27. The process according to claim 1, wherein the polymer (I) is a polyether polymer.

28. The process according to claim 1, wherein the polymer (I) is a polysiloxane polymer.

29. The process according to claim 1, wherein the polymer (I) has a glass transition point not lower than 25° C. and the polymer chain newly produced by atom transfer radical polymerization with the addition of polymer (I) has a glass transition point not higher than 25° C., or the polymer (I) has a glass transition point not higher than 25° C. and the polymer chain newly produced by atom transfer radical polymerization with the addition of polymer (I) has a glass transition point not lower than 25°C.

\* \* \* \* \*